(12) United States Patent
Park

(10) Patent No.: US 12,451,730 B2
(45) Date of Patent: *Oct. 21, 2025

(54) WIRELESS POWER TRANSFERRING METHOD AND DEVICE THEREFOR

(71) Applicant: LG ELECTRONICS INC., Seoul (KR)

(72) Inventor: Yongcheol Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/016,964

(22) Filed: Jan. 10, 2025

(65) Prior Publication Data

US 2025/0149922 A1    May 8, 2025

Related U.S. Application Data

(63) Continuation of application No. 18/299,793, filed on Apr. 13, 2023, now Pat. No. 12,230,972, which is a (Continued)

(51) Int. Cl.
*H02J 50/10* (2016.01)
*H02J 50/12* (2016.01)
(Continued)

(52) U.S. Cl.
CPC .............. *H02J 50/10* (2016.02); *H02J 50/12* (2016.02); *H02J 50/60* (2016.02); *H02J 50/80* (2016.02); *H04B 5/79* (2024.01); *H04L 9/40* (2022.05)

(58) Field of Classification Search
None
See application file for complete search history.

(56) References Cited

U.S. PATENT DOCUMENTS 8,890,470 B2 *  11/2014 Partovi ................. H02J 7/0044
                                                      320/108
9,887,037 B2 *   2/2018 Lee ............................ H04B 5/79
(Continued)

FOREIGN PATENT DOCUMENTS

EP           3035713 A1 *  6/2016 ............. H04W 4/80

*Primary Examiner* — Adi Amrany
(74) *Attorney, Agent, or Firm* — Birch, Stewart, Kolasch & Birch, LLP

(57) ABSTRACT

A method for transferring, by a wireless power transmitter, wireless power, the method including performing digital ping in a ping phase; receiving a configuration packet of a wireless power receiver in a configuration phase after the ping phase; performing a negotiation of a power transfer contract in a negotiation phase after the configuration phase; and transferring the wireless power to the power receiver based on the power transfer contract in a power transfer phase after the negotiation phase, wherein the configuration packet includes a negotiation field, wherein the negotiation field related to whether the negotiation phase is supported is composed of 1 bit, wherein the configuration packet includes a out-of-band field, wherein the out-of-band field is composed of 1 bit, and wherein, based on the out-of-band field having a value of 1, the out-of-band field indicates that the wireless power receiver supports out-of-band communication, and based on the out-of-band field having a value of 0, the out-of-band field indicates that the wireless power receiver does not support the out-of-band communication.

8 Claims, 15 Drawing Sheets

Related U.S. Application Data continuation of application No. 17/539,895, filed on Dec. 1, 2021, now Pat. No. 11,658,513, which is a continuation of application No. 16/349,914, filed as application No. PCT/KR2017/012737 on Nov. 10, 2017, now Pat. No. 11,205,929.

(60) Provisional application No. 62/540,052, filed on Aug. 1, 2017, provisional application No. 62/538,790, filed on Jul. 30, 2017, provisional application No. 62/422,567, filed on Nov. 15, 2016.

(51) Int. Cl.
*H02J 50/60* (2016.01)
*H02J 50/80* (2016.01)
*H04B 5/79* (2024.01)
*H04L 9/40* (2022.01)

(56) References Cited

U.S. PATENT DOCUMENTS

| | | | | |
|---|---|---|---|---|
| 2009/0094179 A1* | 4/2009 | Jager | H04M 1/72454 | 706/21 |
| 2011/0127951 A1* | 6/2011 | Walley | H02J 50/10 | 320/108 |
| 2012/0329405 A1* | 12/2012 | Lee | H02J 50/12 | 455/73 |
| 2013/0062961 A1* | 3/2013 | Park | H02J 50/90 | 307/104 |
| 2013/0229066 A1* | 9/2013 | Karaoguz | H02J 50/80 | 307/104 |
| 2013/0288595 A1* | 10/2013 | Lee | H04W 88/02 | 455/39 |
| 2014/0239732 A1* | 8/2014 | Mach | H02H 3/38 | 307/104 |
| 2014/0347008 A1* | 11/2014 | Chae | H02J 50/12 | 320/108 |
| 2014/0368053 A1* | 12/2014 | Lee | H02J 7/00047 | 307/104 |
| 2015/0006395 A1* | 1/2015 | Chu | G06Q 20/40 | 705/44 |
| 2015/0008756 A1* | 1/2015 | Lee | H04B 5/266 | 307/104 |
| 2015/0008876 A1* | 1/2015 | Kwak | H02J 7/00304 | 320/108 |
| 2015/0078461 A1* | 3/2015 | Lee | H04B 5/266 | 375/256 |
| 2015/0130409 A1* | 5/2015 | Lee | H02J 50/50 | 320/108 |
| 2015/0137746 A1* | 5/2015 | Lee | H02J 7/00036 | 320/108 |
| 2015/0155918 A1* | 6/2015 | Van Wageningen | H02J 50/80 | 307/104 |
| 2015/0244201 A1* | 8/2015 | Chu | H02J 50/80 | 320/108 |
| 2015/0380976 A1* | 12/2015 | Heo | H02J 50/90 | 455/573 |
| 2016/0043590 A1* | 2/2016 | Ha | H02J 50/402 | 320/108 |
| 2016/0183031 A1* | 6/2016 | Ranganathan | H04L 69/24 | 455/41.1 |
| 2016/0233728 A1* | 8/2016 | Park | H02J 50/12 | |
| 2016/0336816 A1* | 11/2016 | Mach | H02J 50/10 | |
| 2017/0013457 A1* | 1/2017 | Polak | G06Q 20/327 | |
| 2017/0018954 A1* | 1/2017 | Lee | H04B 5/79 | |
| 2017/0061142 A1* | 3/2017 | Niessen | G06F 1/26 | |
| 2018/0138749 A1* | 5/2018 | Lee | H02J 50/12 | |

* cited by examiner

[FIG. 1]
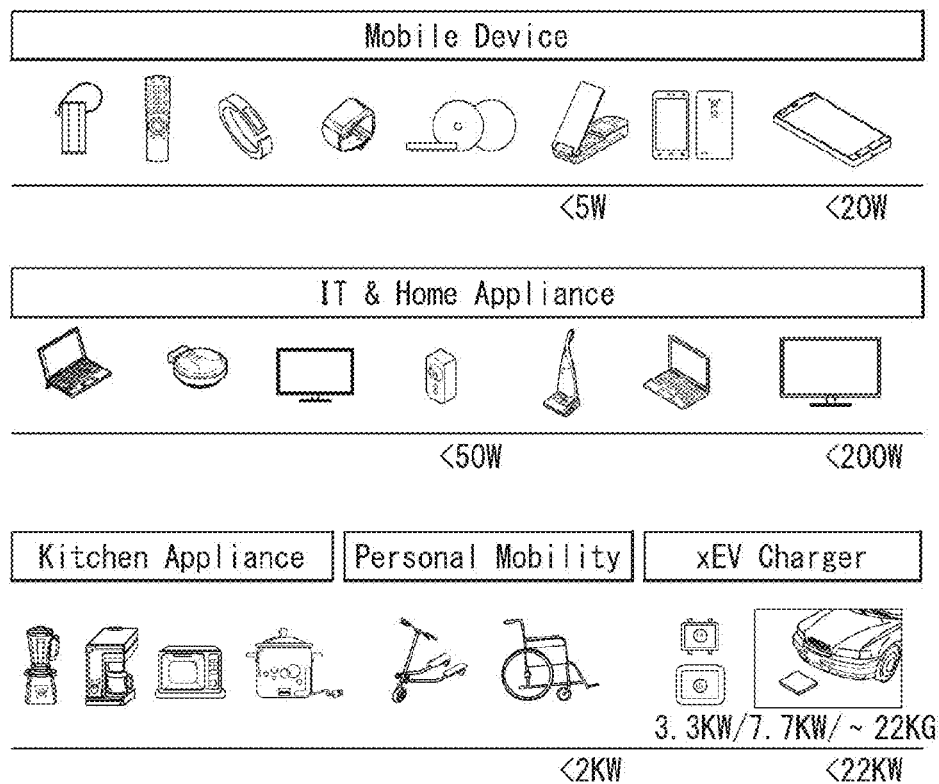

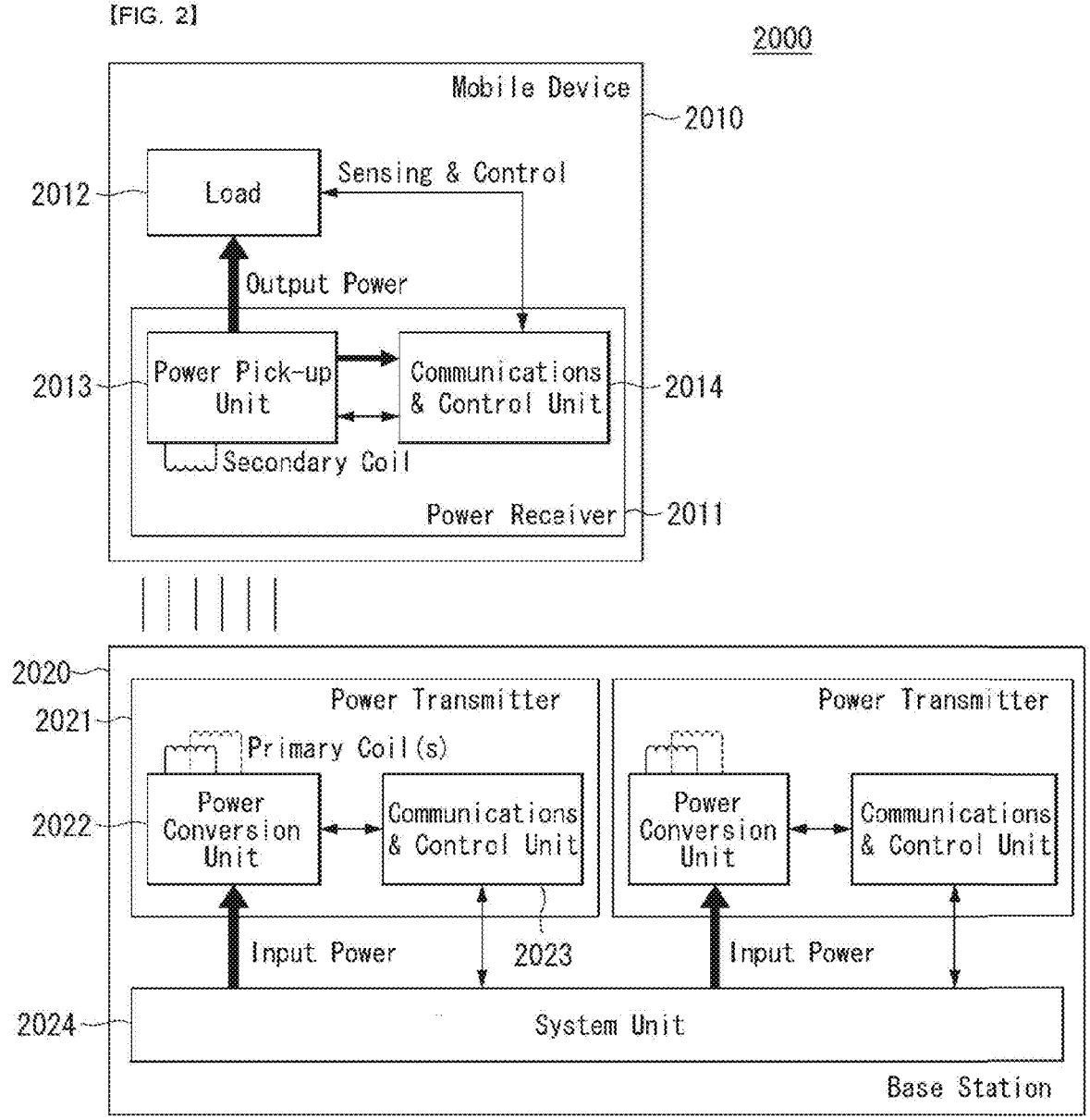

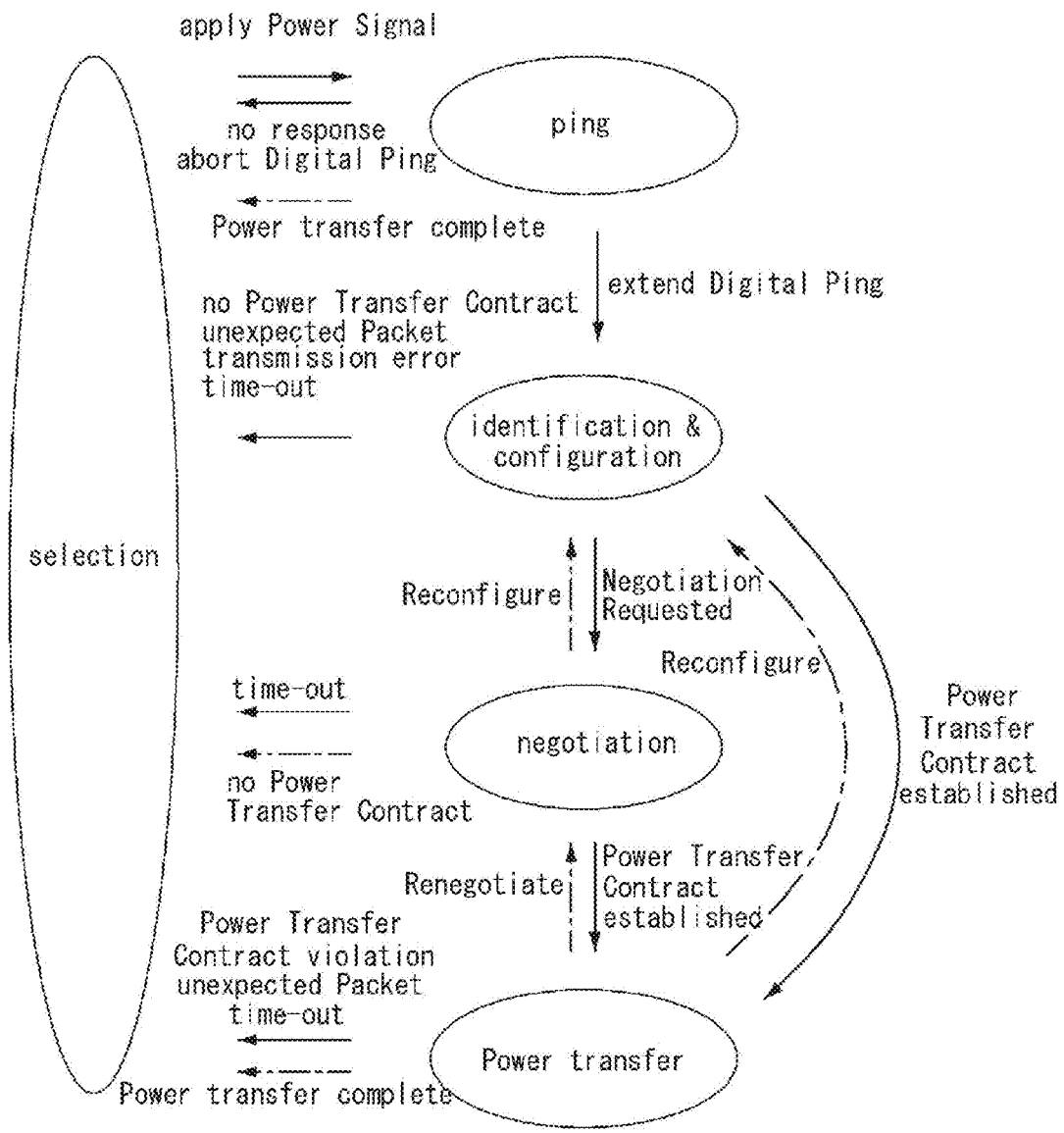

[FIG. 4]
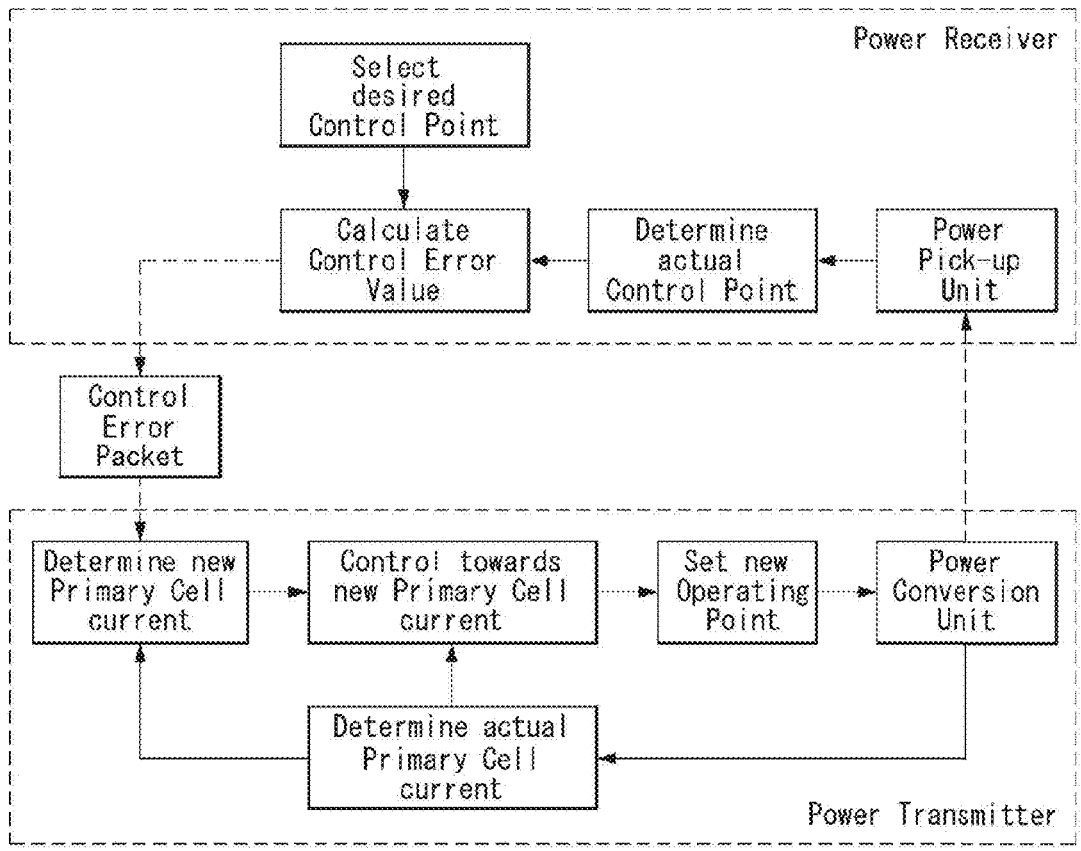
[FIG. 5]
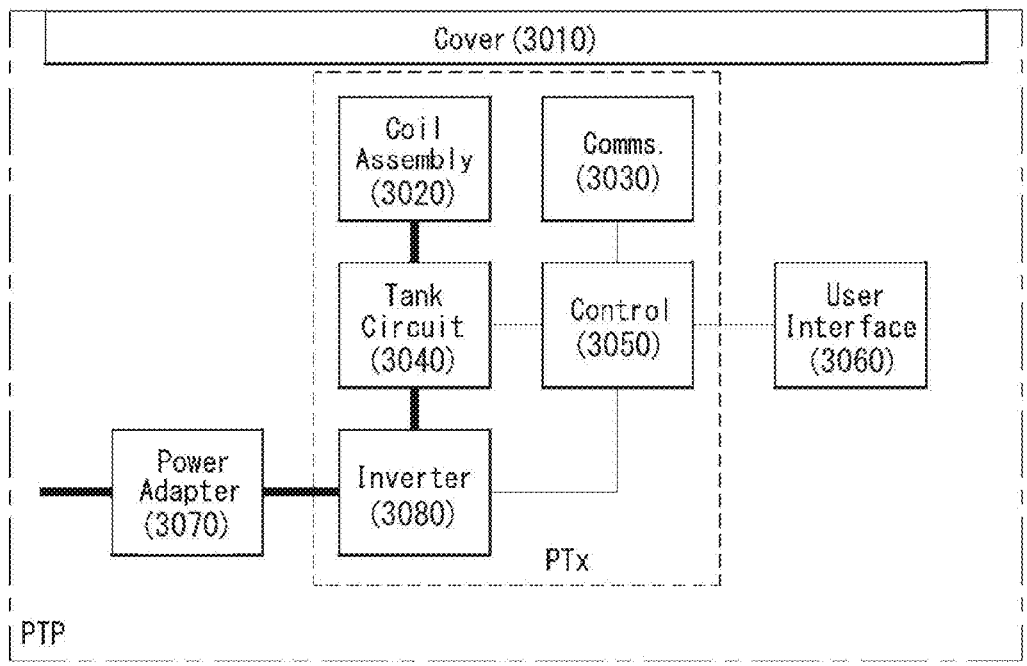

[FIG. 6]
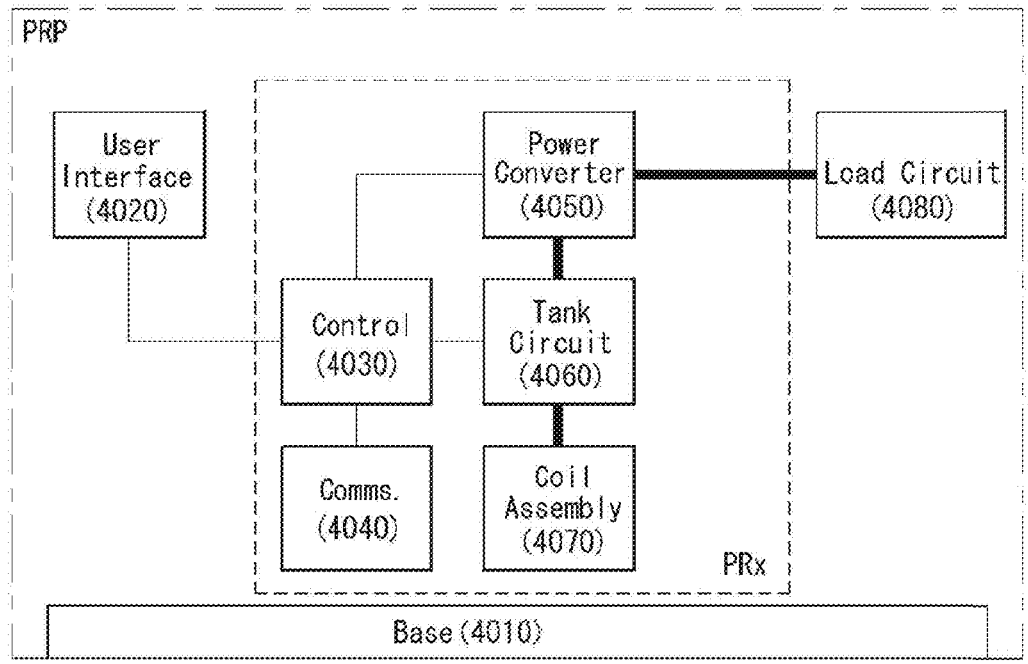
[FIG. 7]
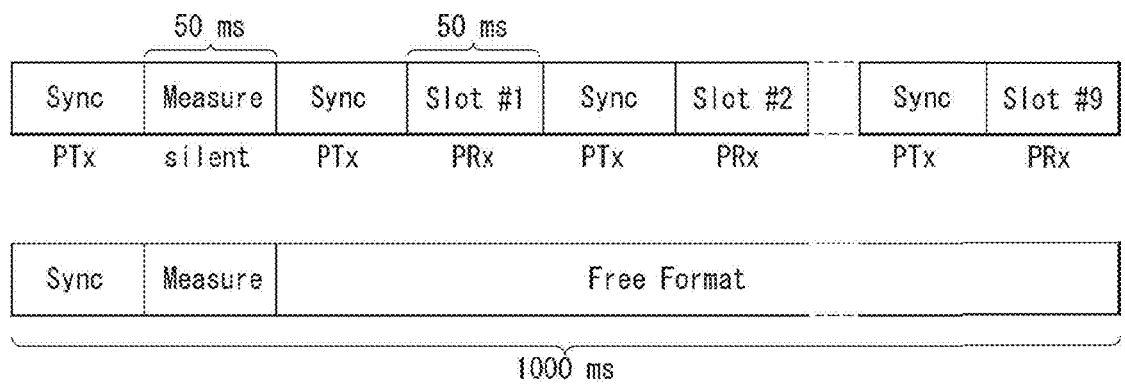
[FIG. 8]
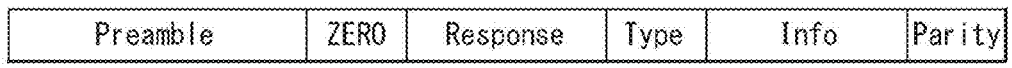
| Response | Type | Info(Type is ZERO) | Info(Type is ONE) |
|---|---|---|---|
| '00':no comms | ZERO:slot sync | '00':allocated | '00':slotted |
| '01':comms error | ONE:frame sync | '01':locked | '01':free format |
| '10':NAK | | '10':free | '10':reserved |
| '11':ACK | Parity:odd | '11':reserved | '11':reserved |

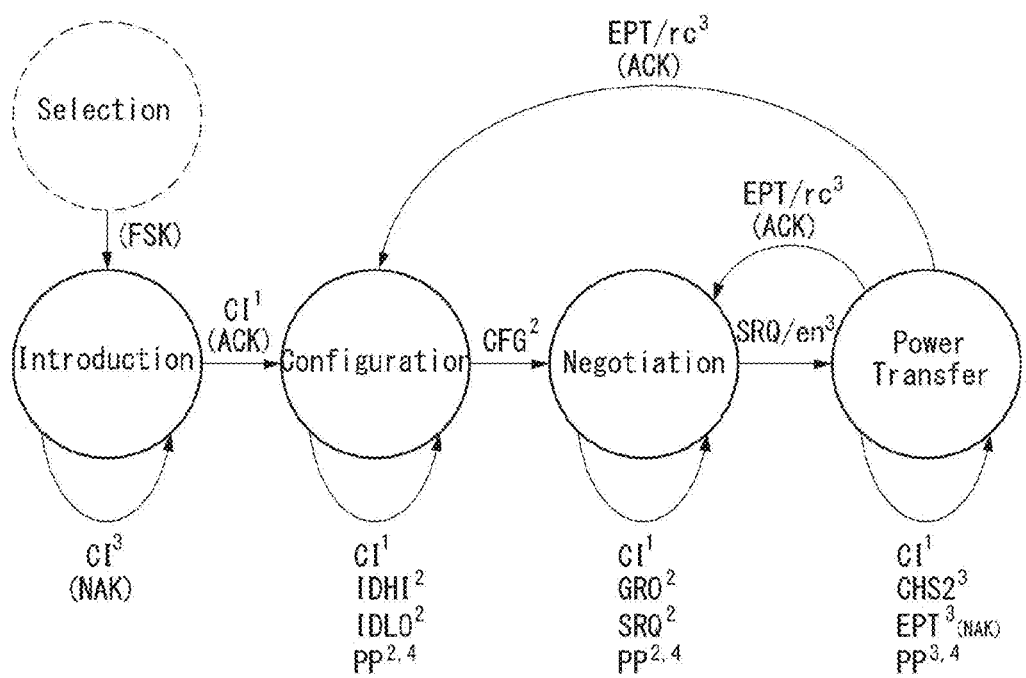
[FIG. 9]

[FIG. 10]
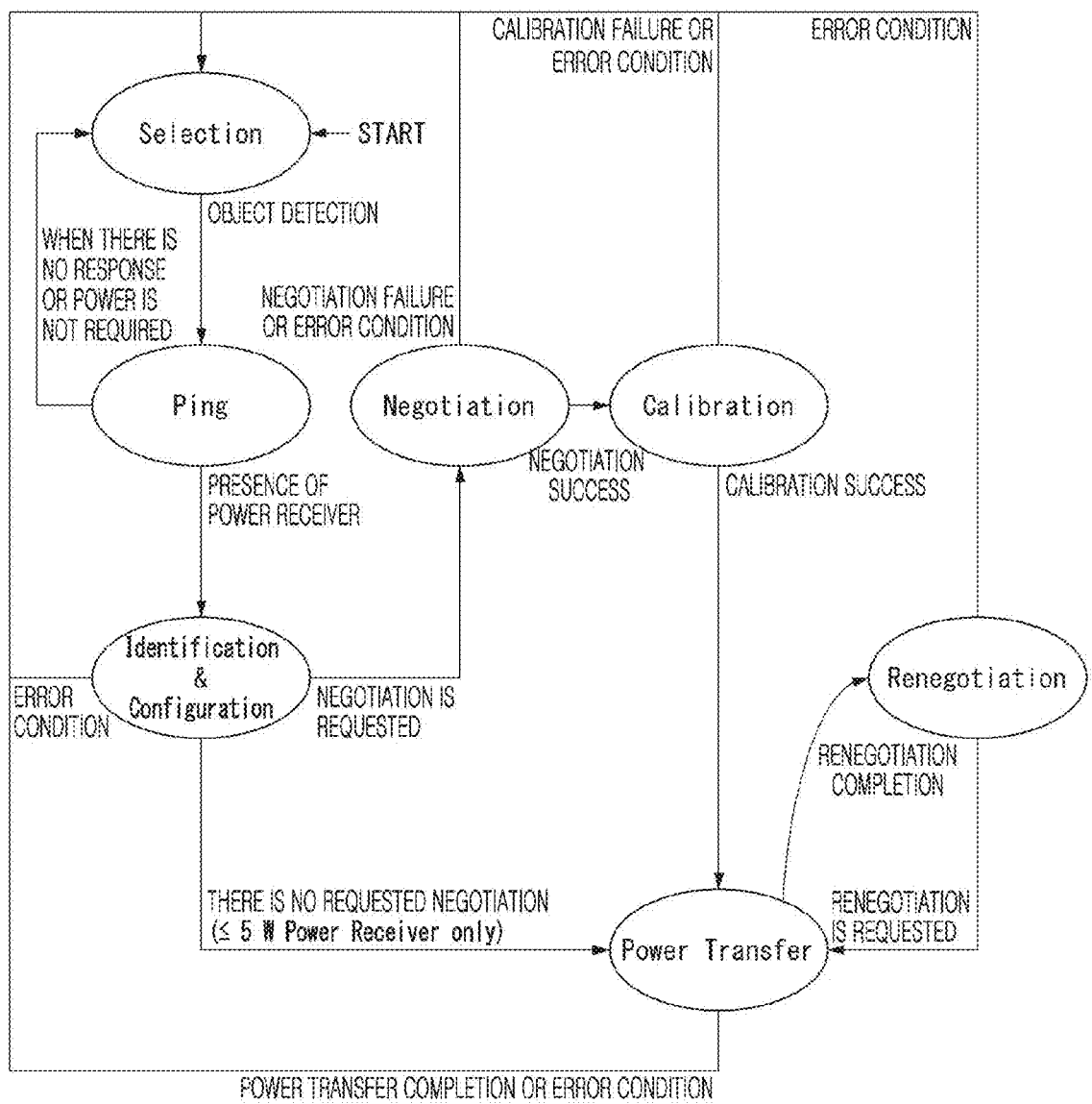

[FIG. 11]
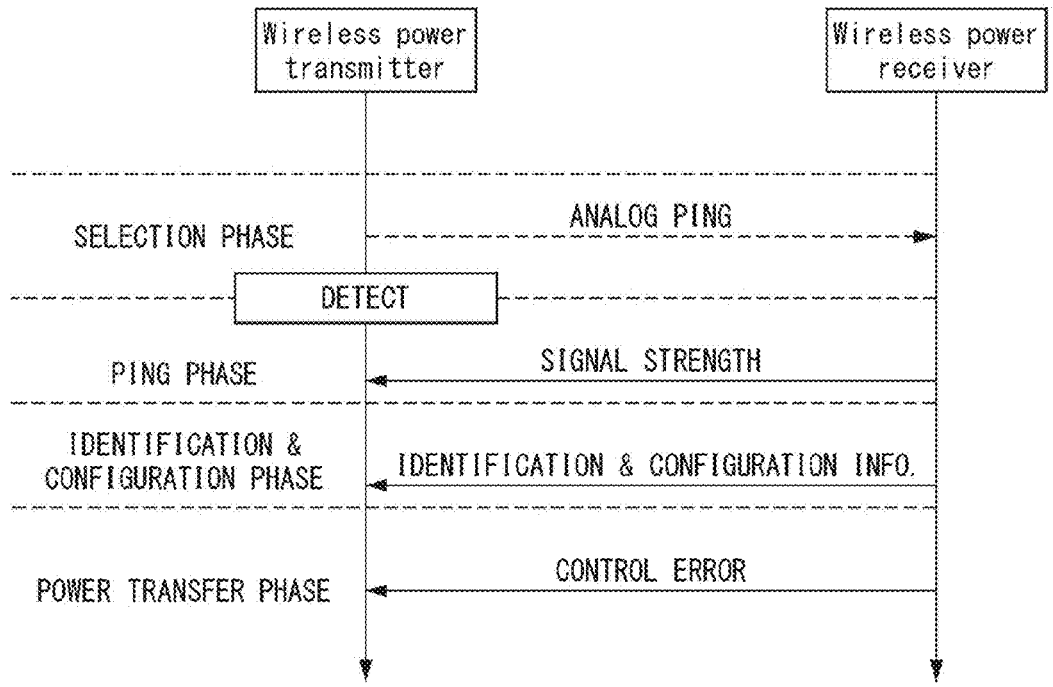
[FIG. 12]
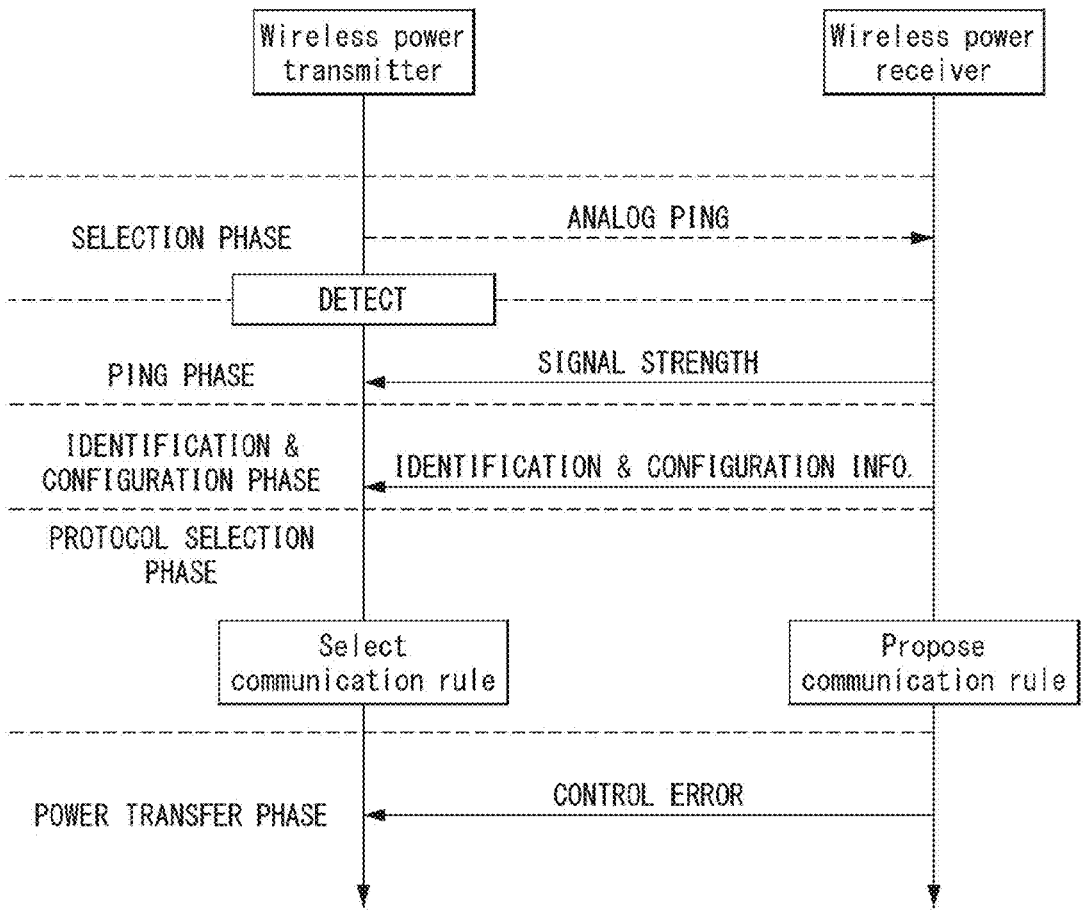

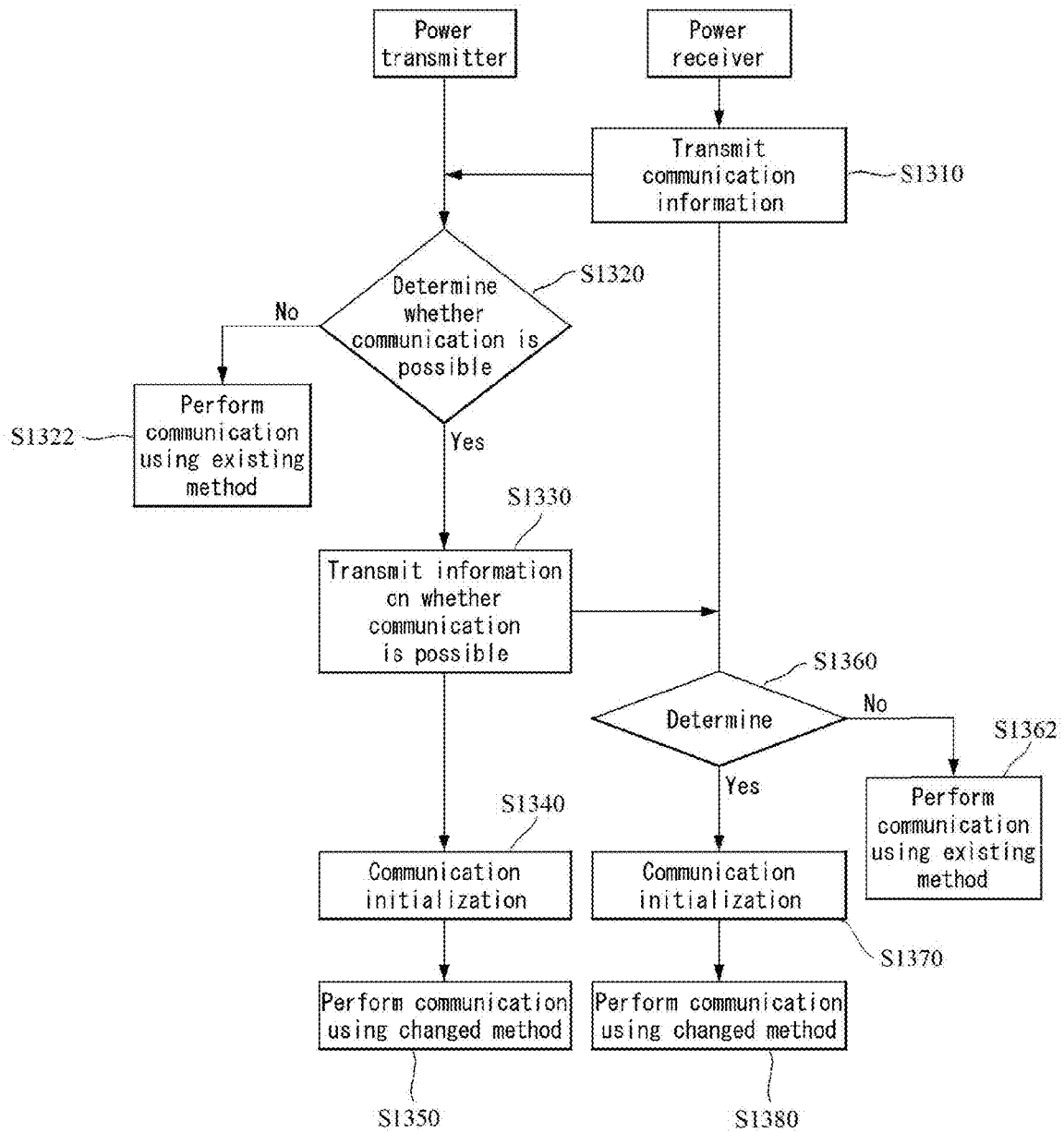
[FIG. 13]

[FIG. 14]

| Profile | Power class | Communication | Operating frequency | Application |
|---|---|---|---|---|
| Mobile | PC0, PC1 | IB OOB(optional) | 87~205 kHz | Smartphone Lap-top |
| Power Tool | PC1 | IB | 87~145 kHz | Power tools |
| Kitchen | PC2 | NFC-based | < 100 kHz | Kitchen Appliances |
| Wearable | PC-1 | IB | 87~205 kHz | Wearable devices |

[FIG. 15]

Configuration Packet (0x51)

| | b7 | b6 | b5 | b4 | b3 | b2 | b1 | b0 |
|---|---|---|---|---|---|---|---|---|
| $B_0$ | Power Class | | Maximum Power Value | | | | | |
| $B_1$ | Profile | | Reserved | | | | | |
| $B_2$ | Prop | Reserved | | | ZERO | Count | | |
| $B_3$ | Window Size | | | | Window Offset | | | |
| $B_4$ | Neg* | Polarity* | | Depth* | | Reserved | | |

[FIG. 16]

Capability packet (Header: 0x31)

| | b7 | b6 | b5 | b4 | b3 | b2 | b1 | b0 |
|---|---|---|---|---|---|---|---|---|
| $B_0$ | Power Class | | Guaranteed Power Value | | | | | |
| $B_1$ | Profile | | Potential Power Value | | | | | |
| $B_2$ | Reserved | | | | | | WPID | Not Res Sens |

[FIG. 17]

Configuration Packet (0x51)

|    | b7 | b6 | b5 | b4 | b3 | b2 | b1 | b0 |
|----|----|----|----|----|----|----|----|----|
| B0 | Power Class ||| Maximum Power Value |||||
| B1 | Profile |||| Reserved ||||
| B2 | Prop | Reserved || ZERO || Count |||
| B3 | Window Size |||| Window Offset ||||
| B4 | Neg* | Polarity* | Depth* || Reserved ||||

[FIG. 18]

Capability packet (Header: 0x31)

|    | b7 | b6 | b5 | b4 | b3 | b2 | b1 | b0 |
|----|----|----|----|----|----|----|----|----|
| B0 | Power Class ||| Guaranteed Power Value |||||
| B1 | Reserved ||| Potential Power Value |||||
| B2 | Profile |||| Reserved || WPID | Not Res Sens |

[FIG. 19]

Configuration Packet (0x51)

|    | b7 | b6 | b5 | b4 | b3 | b2 | b1 | b0 |
|----|----|----|----|----|----|----|----|----|
| B0 | Power Class ||| Maximum Power Value |||||
| B1 | Profile |||| Reserved ||||
| B2 | Prop | Reserved || ZERO || Count |||
| B3 | Window Size |||| Window Offset ||||
| B4 | Neg* | Polarity* | Depth* || Reserved ||||

[FIG. 20]

Capability packet (Header: 0x31)

|    | b7 | b6 | b5 | b4 | b3 | b2 | b1 | b0 |
|----|----|----|----|----|----|----|----|----|
| B0 | Power Class ||| Guaranteed Power Value |||||
| B1 | Reserved ||| Potential Power Value |||||
| B2 | Profile |||| Reserved || WPID | Not Res Sens |

[FIG. 21]
| Requirements | Preference for IB/OOB |
|---|---|
| One-to-one relation (safety control) | IB (or close-coupled OOB such as NFC) |
| Compatibility with PC0 | IB (or close-coupled OOB such as NFC) |
| Regulation issue with high power modulation | OOB |
| Load variation (motor-driven device) | OOB |
| More safe and less PFC dependence, Well isolated from power supply channel | OOB |
[FIG. 22]
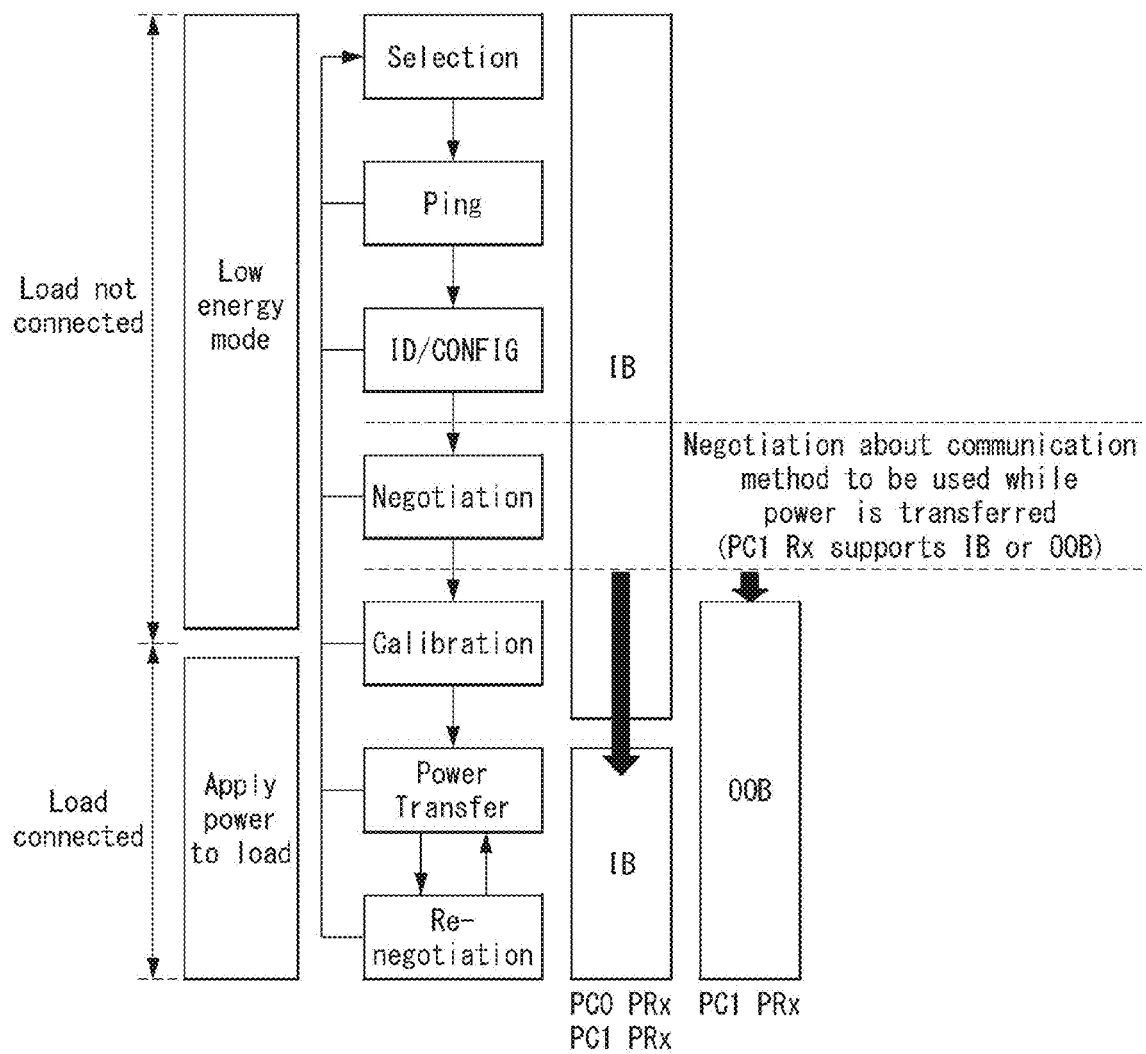

[FIG. 23]
Configuration Packet (0x51)
| | b7 | b6 | b5 | b4 | b3 | b2 | b1 | b0 |
|---|---|---|---|---|---|---|---|---|
| B0 | Power Class | | Maximum Power Value | | | | | |
| B1 | Reserved | | | | | | | OOB |
| B2 | Prop | Reserved | | | ZERO | Count | | |
| B3 | Window Size | | | | Window Offset | | | |
| B4 | Neg* | Polarity* | | Depth* | | Reserved | | |
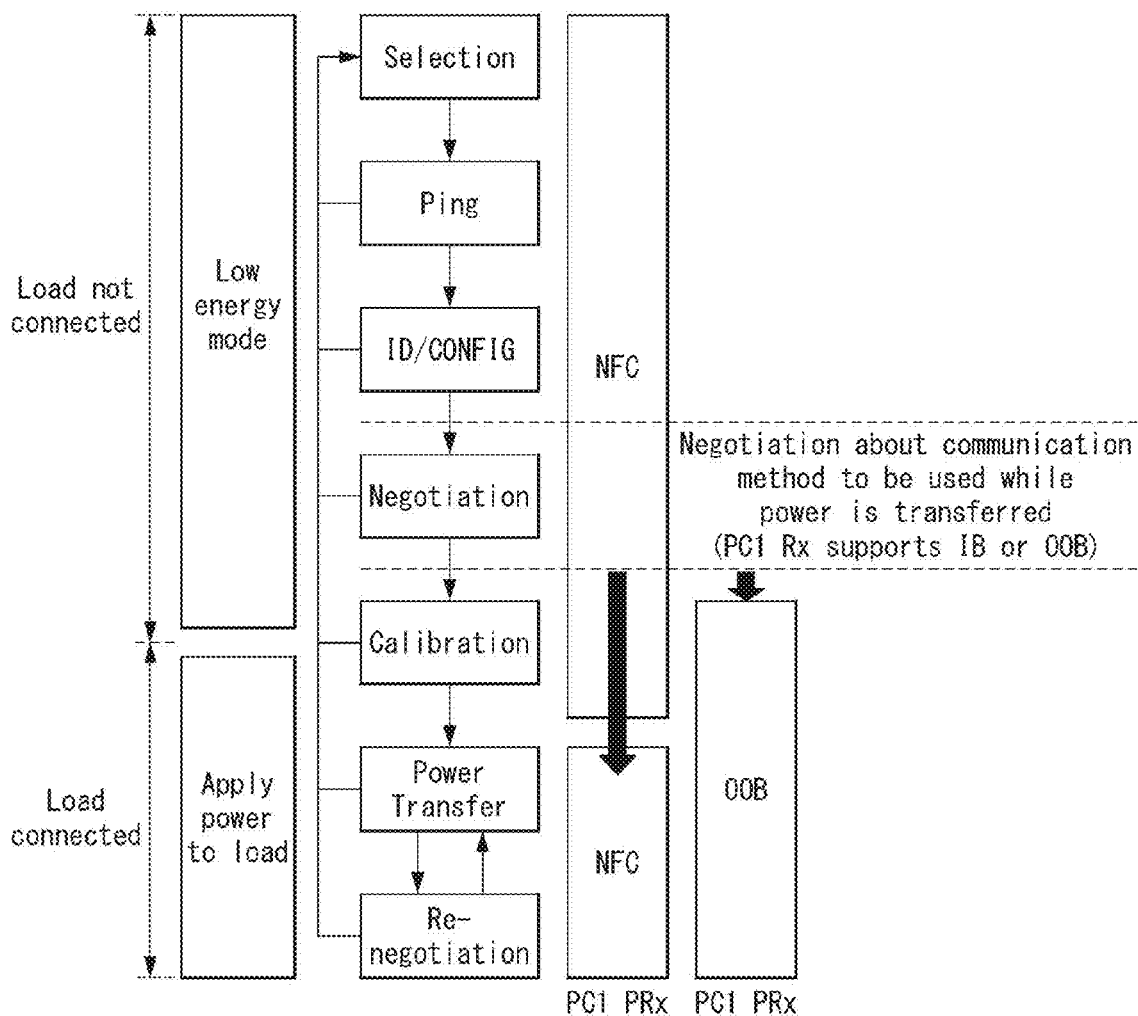
[FIG. 24]

[FIG. 25]
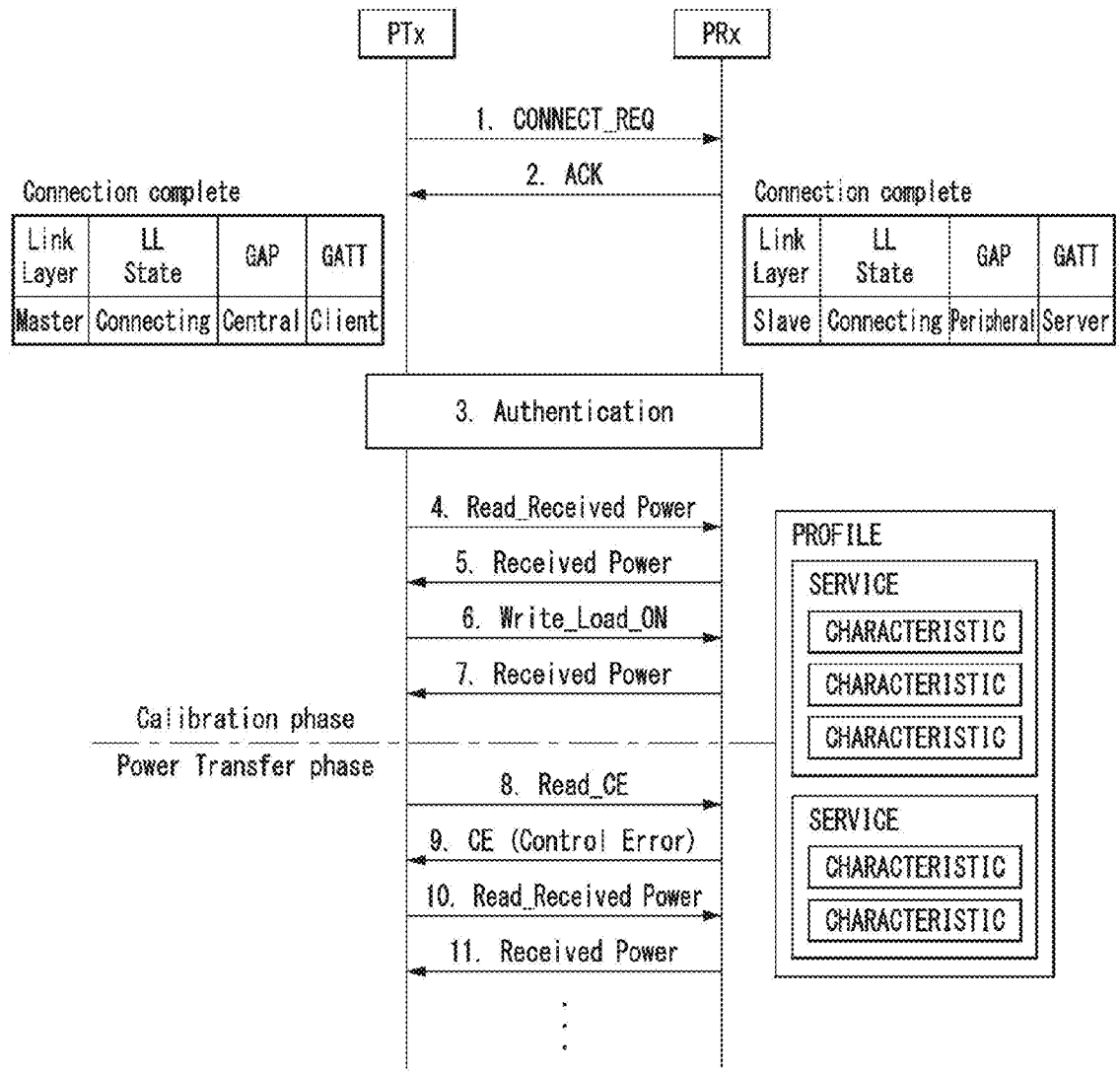
[FIG. 26]

[FIG. 27]
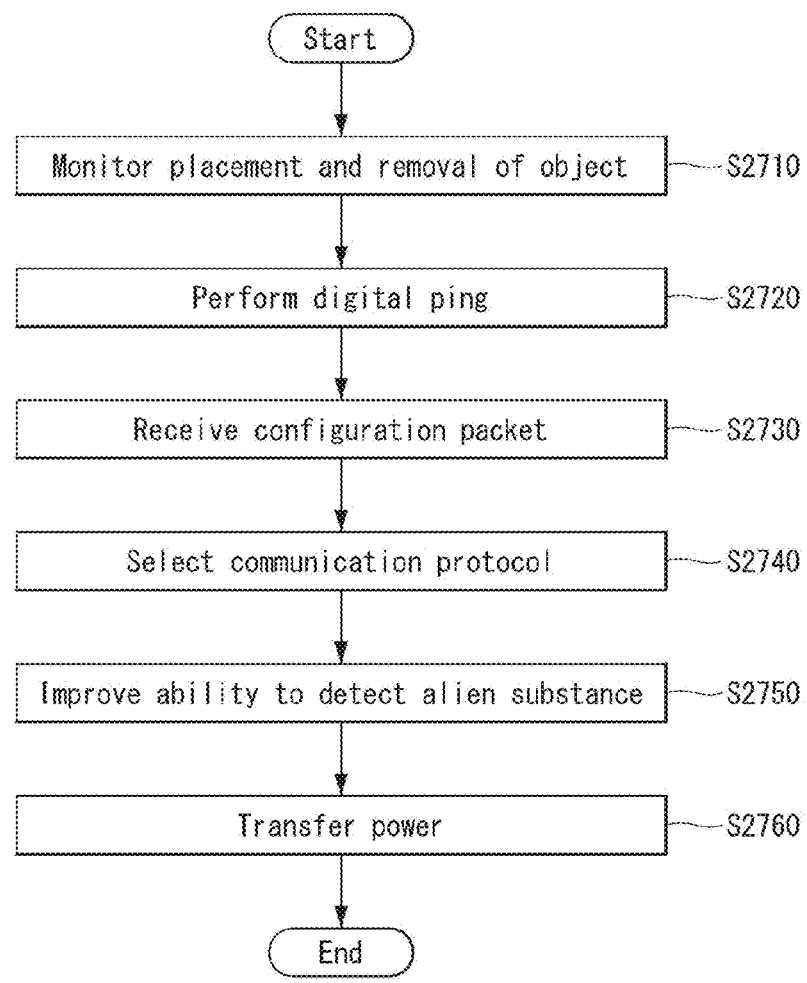

WIRELESS POWER TRANSFERRING METHOD AND DEVICE THEREFOR

CROSS-REFERENCE TO RELATED APPLICATIONS

This application is a Continuation of U.S. application Ser. No. 18/299,793 filed on Apr. 13, 2023 (now U.S. Pat. No. 12,230,972 issued on Feb. 18, 2025), which is a Continuation of U.S. application Ser. No. 17/539,895 filed on Dec. 1, 2021 (now U.S. Pat. No. 11,658,513 issued on May 23, 2023), which is a Continuation of U.S. application Ser. No. 16/349,914 filed on May 14, 2019 (now U.S. Pat. No. 11,205,929 issued on Dec. 21, 2021), which is the National Phase of PCT International Application No. PCT/KR2017/012737, filed on Nov. 10, 2017, which claims priority under 35 U.S.C. 119(e) to U.S. Provisional Application Nos. 62/422,567, filed on Nov. 15, 2016, 62/538,790, filed on Jul. 30, 2017, and 62/540,052, filed on Aug. 1, 2017, all of which are hereby expressly incorporated by reference into the present application.

BACKGROUND OF THE INVENTION

Field of the Invention

The present invention relates to a wireless power transferring method and a device therefor.

Discussion of the Related Art

A contactless wireless charging method is an energy transfer method for electromagnetically transferring energy without using a wire in a method for transmitting energy through an existing wire so that the energy is used as power for an electronic device. The contactless wireless transmission method includes an electromagnetic induction method and a resonant method. In the electromagnetic induction method, a power transmission unit generates a magnetic field through a power transmission coil (i.e., a primary coil), and a power reception coil (i.e., a secondary coil) is placed at the location where an electric current may be induced so that power is transferred. In the resonant method, energy is transmitted using a resonant phenomenon between the transmission coil and the reception coil. In this case, a system is configured so that the primary coil and the secondary coil have the same resonant frequency, and resonant mode energy coupling between the transmission and reception coils is used.

SUMMARY OF THE INVENTION

This specification newly defines a profile concept, that is, an index/criterion for a compatibility determination, in order to identify a power transmitter and a power receiver in which compatibility is mutually maintained.

Furthermore, this specification proposes a communication protocol/method selection method for stably maintaining communication compatibility between a power transmitter and a power receiver having the same profile, but having different power classes.

In accordance with an embodiment of the present invention, a wireless power transfer method of a power transmitter may include a selection phase of monitoring the placement and removal of an object for an interface surface of the power transmitter, a ping phase of receiving a response from a power receiver by performing digital ping using a first communication protocol, an identification/configuration phase of receiving a configuration packet including configuration information of the power receiver using the first communication protocol, wherein the configuration packet includes power class information of the power receiver and communication protocol information of the power receiver, a negotiation phase of selecting any one of the first communication protocol and a second communication protocol different from the first communication protocol based on the power class information and/or the communication protocol information using the first communication protocol, a calibration phase of improving the ability to detect a foreign object by controlling a specific parameter, and a power transfer phase of performing communication with the power receiver using the selected communication protocol and transferring power to the power receiver.

Furthermore, the power class information may indicate a power class classified based on a received power level of the power receiver, and the communication protocol information may indicate a communication protocol supported or preferred by the power receiver.

Furthermore, the negotiation phase may include checking the power class of the power receiver based on the power class information, selecting the first communication protocol when the power class is a power class 0, and selecting the first or the second communication protocol based on the communication protocol information of the power receiver when the power class is a power class 1.

Furthermore, the phase of selecting the first or the second communication protocol may include selecting the second communication protocol when the communication protocol information indicates that the power receiver supports or prefers the second communication protocol, and selecting the first communication protocol when the communication protocol information indicates that the power receiver does not support or prefer the second communication protocol.

Furthermore, the power class 0 may indicate that received power of the power receiver is within a 5 W to 30 W range, and the power class 1 may indicate that received power of the power receiver is within a 30 W to 150 W range.

Furthermore, the first communication protocol may correspond to an inband (IB) communication protocol defined in a wireless power transmission and reception system, and the second communication protocol may correspond to an out-of-band (OOB) communication protocol defined in a different communication system other than the wireless power transmission and reception system.

Furthermore, the IB communication protocol may correspond to a communication protocol based on a load modulation and frequency shift keying (FSK) method, and the OOB communication protocol may correspond to a short range communication protocol.

Furthermore, when the second communication protocol is selected in the negotiation phase and the second communication protocol corresponds to Bluetooth, the negotiation phase may further include receiving, from the power receiver, a Bluetooth medium access control (MAC) address of the power receiver used in the Bluetooth.

Furthermore, the calibration phase may include transmitting, to the power receiver, a connection request message including the Bluetooth MAC address and parameters necessary to establish the Bluetooth connection.

Furthermore, the power transmitter and the power receiver may have the same profile.

Furthermore, the compatibility of power transfer and communication is maintained between the power transmitter and the power receiver having the same profile.

Furthermore, the profile of the power receiver may be indicated through the configuration packet.

Furthermore, the profile of the power transmitter may be indicated through a capability packet including information on a power level transferred by the power transmitter.

Furthermore, a power transmitter includes a coil assembly configured to comprise at least one primary coil generating a magnetic field, a power conversion unit configured to convert electric energy into a power signal, and a communication and control unit configured to control communication and power transfer with the power receiver. The power transmitter may be configured to monitor a placement and removal of an object for an interface surface of the power transmitter by controlling the coil assembly, perform digital ping through a first communication protocol by controlling the communication and control unit and receive a response from a power receiver, and receive a configuration packet including configuration information of the power receiver through the first communication protocol by controlling the communication and control unit, wherein the configuration packet may include power class information of the power receiver and communication protocol information of the power receiver, select any one of the first communication protocol and a second communication protocol different from the first communication protocol based on the power class information and/or the communication protocol information through the first communication protocol by controlling the communication and control unit, improve the ability to detect a foreign object by controlling a specific parameter, perform communication with the power receiver through the selected communication protocol by controlling the communication and control unit, and transfer power to the power receiver by controlling the power conversion unit.

Furthermore, the power class information may indicate a power class classified based on a received power level of the power receiver, and the communication protocol information may indicate a communication protocol supported or preferred by the power receiver.

A conventional communication protocol/method selection method has a problem in that communication compatibility is not stably maintained between a power transmitter and power receiver having different power classes because a profile and/or power class is taken into consideration.

In contrast, the communication protocol/method selection method of the present invention has effects in that communication compatibility is stably maintained and an efficient communication protocol/method can be selected for each situation because a communication protocol/method is selected by taking into consideration a profile and/or power class.

In addition, various effects according to an embodiment of the present invention are described in detail hereinafter.

BRIEF DESCRIPTION OF THE DRAWINGS

FIG. 1 illustrates an embodiment of various electronic devices into which a wireless charging system is introduced.

FIG. 2 illustrates a wireless power transmission/reception system according to an embodiment of the present invention.

FIG. 3 is a flow diagram illustrating a power transmission/reception method in an inductive mode.

FIG. 4 illustrates a power transmission control method in the inductive mode.

FIG. 5 illustrates a power transmission device according to an embodiment of the present invention.

FIG. 6 illustrates a power reception device according to an embodiment of the present invention.

FIG. 7 illustrates a frame structure for data communication during power transmission.

FIG. 8 is a diagram illustrating a sync packet according to an embodiment of the present invention.

FIG. 9 is a diagram illustrating a power transmission method in a shared mode.

FIG. 10 is a diagram illustrating a method for controlling a wireless power transmission/reception system to which FOD extension is applied according to an embodiment of the present invention.

FIGS. 11 and 12 are concept views showing a WPC communication flow.

FIG. 13 is a communication flowchart according to an embodiment of the present invention.

FIG. 14 is a table illustrating profiles newly defined according to an embodiment of the present invention.

FIG. 15 is a diagram illustrating a configuration packet of a power receiver according to a first embodiment of the present invention.

FIG. 16 is a diagram illustrating a capability packet of a power transmitter according to a first embodiment of the present invention.

FIG. 17 is a diagram illustrating a configuration packet of a power receiver according to a second embodiment of the present invention.

FIG. 18 is a diagram illustrating a capability packet of a power transmitter according to a second embodiment of the present invention.

FIG. 19 is a diagram illustrating a configuration packet of a power receiver according to a third embodiment of the present invention.

FIG. 20 is a diagram illustrating a capability packet of a power transmitter according to a third embodiment of the present invention.

FIG. 21 is a table illustrating preference for a communication protocol/method for each category according to an embodiment of the present invention.

FIG. 22 is a flowchart illustrating a communication protocol/method selection method of a PCI power transmitter according to an embodiment of the present invention.

FIG. 23 illustrates a configuration packet according to an embodiment of the present invention.

FIG. 24 is a flowchart illustrating a communication protocol/method selection method of a PCI power transmitter according to an embodiment of the present invention.

FIG. 25 is a diagram illustrating a Bluetooth (or BLE) medium access control (MAC) packet of a power receiver according to an embodiment of the present invention.

FIG. 26 illustrates a Bluetooth (or BLE) handover procedure according to an embodiment of the present invention.

FIG. 27 is a flowchart illustrating a wireless power transfer method of a power transmitter according to an embodiment of the present invention.

DETAILED DESCRIPTION OF THE EMBODIMENTS

Terms used in this specification are common terms which are now widely used by taking into consideration functions in this specification, but the terms may be changed depending on an intention of those skilled in the art, a use practice, or the appearance of a new technology. Furthermore, in a specific case, some terms have been randomly selected by the applicant. In this case, the meaning of a corresponding term is described in a corresponding part of a corresponding embodiment. Accordingly, the terms used in this specification should not be understood simply based on their names but should be understood based on their substantial meanings and contents over this specification.

Furthermore, although embodiments of the present invention are described in detail with reference to the accompanying drawings and contents described in the drawings, the present invention is not limited to or restricted by the embodiments.

Hereinafter, some embodiments of the present invention are described in detail with reference to the accompanying drawings.

FIG. 1 illustrates an embodiment of various electronic devices into which a wireless charging system is introduced. In FIG. 1, electronic devices are classified according to an amount of power transmitted and received in the wireless charging system.

Low power (approximately 5 W or less or approximately 20 W or less) wireless charging may be applied to wearable devices such as a smart clock and smart glass and mobile/portable electronic devices such as an earphone, a remote controller, a smart phone, PDA, a tablet PC, etc. Medium power (approximately 50 W or less or approximately 200 W or less) may be applied to medium and small appliances such as notebook computers, robot cleaners, TVs, sound devices, cleaners, monitors, and the like. In addition, large power (approximately 2 kW or less or 22 kW or less) wireless charging may be applied to kitchen appliances such as a blender, a microwave oven, and an electric rice cooker, personal mobile devices such as a wheelchair, an electric kickboard, an electric bicycle, and an electronic device/moving means such as an electric vehicle, etc. The electronic devices/moving means illustrated in FIG. 1 may include a power receiver to be described below.

Hereinafter, a low power and a mobile device will be mainly described, but this relates to an embodiment, and the wireless power transmission/reception method according to the present invention may be applied to various electronic devices described above.

Wireless Power Consortium (WPC) standardizes wireless power transmission/reception related technology for standardization of wireless power transmission/reception devices.

The recently developed wireless charging system may support low power transmission and reception up to approximately 5 W. However, recently, a size of a mobile device becomes large and a battery capacity also increases, in the case of such a low power charging system, there is a problem in that a charging time is long and efficiency is lowered, and as a result, a wireless charging system for supporting medium power transmission and reception of up to approximately 15 W to 20 W. At the same time, a wireless charging system having a resonance method added to charge a plurality of electronic devices has also been developed. The present invention relates to a wireless charging system having a resonance method added and intends to propose a resonance type wireless charging transmitter/receiver that is compatible with a low-power/medium-power induction-type wireless charging transmitter/receiver.

Hereinafter, the inductive and resonant wireless charging transmitter and wireless charging receiver proposed by the present invention and a charging method and a communication protocol using the same will be described. Further, hereinafter, a resonance type/mode may be referred to as a shard type/mode. In addition, hereinafter, the wireless power transmitter may be referred to as a power transmitter or transmitter and the wireless power receiver may be referred to as a power receiver or receiver.

FIG. 2 illustrates a wireless power transmission/reception system 2000 according to an embodiment of the present invention.

In FIG. 2, the wireless power transmission/reception system 2000 includes a mobile device 2010 and a base station 2020 that receive power wirelessly.

The mobile device 2010 includes a power receiver 2011 that receives wireless power through a secondary coil and a load 2012 that receives and stores the power received by the power receiver 2011 and supplies the received and stored power to a device. In addition, the power receiver 2011 may include a power pick-up unit 2013 that receives a wireless electric power signal communication and converts the received wireless electric power signal into electric energy through the secondary coil and a communications and control unit 2014 that controls communication and electric power signal transmission/reception (power transfer/reception) with the power transmitter. The mobile device may also be referred to below as a power reception device.

The base station 2020 as an apparatus that provides inductive power or resonant power may include one or more power transmitters 2021 and system units 2024. The power transmitter 2021 may transmit the inductive/resonant power and control power transmission. The power transmitter 2021 may include a power conversion unit 2022 that generates a magnetic field through a primary coil(s) and converts/transmits the electric energy into an electric power signal and a communications and control unit 2023 that controls communication and power transfer with the power receiver 2011 so as to transmit the power at an appropriate level. The system unit 2024 may perform other operation controls such as input power provisioning, control of a plurality of power transmitters, and user interface control. The base station 2020 may also be referred to below as a power transmission device.

The power transmitter 2021 may control transmission power by controlling an operating point. The controlled operating point may correspond to a combination of a frequency, a duty cycle, and a voltage amplitude. The power transmitter 2021 may control the transmitted power by adjusting at least one of the frequency, the duty cycle/duty ratio, and an amplitude of input voltage. Further, the power transmitter 2021 may supply constant power and the power receiver 2011 may control the received power by controlling a resonant frequency.

A coil or coil portion may hereinafter be referred to as a coil assembly, a coil cell, or a cell, including the coil and at least one element adjacent to the coil.

Inductive Mode—Low Power and Mid Power

Hereinafter, a power transfer method of the power transmitter/receiver operating in the inductive mode will be described first. However, at least one of a method for describing the inductive mode or phases included in the method may be used selectively or optionally in the resonant mode.

FIG. 3 is a flow diagram illustrating a power transmission/reception method in an inductive mode.

In the wireless charging system according to the present invention, the wireless charging may be performed through five phases. The five phases may include a selection phase, a ping phase, an identification and configuration phase, a negotiation phase, and a power transfer phase and however, the negotiation phase may be omitted in the low power-mode power transmission/reception. That is, in the lower power mode, the power transmission/reception may be performed by four phases and in the intermediate power mode, the negotiation phase may be additionally performed.

In the selection phase, the power transmitter monitors contact/departure of an object with respect to an interface surface provided in the transmitter. As shown in FIG. 2, the wireless power transmitter may sense the contact of an external object by applying the electric power signal. In other words, the power transmitter applies a short electric power signal to the primary coil and senses the current of the primary coil generated by the electric power signal to monitor the presence of the external object. In addition, when the power transmitter receives signal strength information (packet) monitored in the selection phase and detects the object based on the received signal strength information (packet), the power transmitter may select whether the object is the power receiver or a simple external object (a key, a coin, etc.). For such a selection, the power transmitter may further perform at least one of the following phases: the ping phase, the identification/configuration phase, and the negotiation phase.

In the ping phase, the power transmitter may perform digital ping and wait for the response of the power receiver. The digital ping represents the application/transmission of the electric power signal to detect and identify the power receiver. When the power transmitter finds the power receiver, the power transmitter may extend the digital ping to proceed to the identification/configuration phase.

In the identification/configuration phase, the power transmitter may identify the selected power receiver and obtain configuration information of the power receiver, such as a maximum power amount. In other words, the power transmitter may receive the identification/configuration information, obtain information on the power receiver, and use the information to establish a power transfer contract. This power transfer contract may include constraints on a plurality of parameters that characterize power transfer in a subsequent power transfer phase.

In the negotiation phase, the power receiver may negotiate with the power transmitter to create an additional power transfer contract. In other words, the power transmitter may receive a negotiation request/information from the power receiver and the negotiation phase may be performed only if a target receiver is identified as an intermediate power receiver in the identification/configuration phase. In the negotiation phase, additional parameters such as the guaranteed power level of the power transmitter and the maximum power of the power receiver may be negotiated. When the power receiver is a low-power receiver, the negotiation phase may be omitted and the identification/configuration phase may directly proceed to the power transfer phase.

In the power transfer phase, the power transmitter provides power wirelessly to the power receiver. The power transmitter receives control data for transmitted power to control power transfer accordingly. In addition, when restrictions of the parameters depending on the power transfer contract are violated during the power transfer, the power transmitter may stop the power transfer and proceed to the selection phase.

FIG. 4 illustrates a power transfer control method in the inductive mode.

In FIG. 4, each of the power transmitter and the power receiver may include a power conversion unit and a power pickup unit, respectively, as illustrated in FIG. 1.

In the power transfer phase of the inductive mode described above, the power transmitter and the power receiver may control the amount of power transferred by parallel communication with power transmission and reception. The power transmitter and the power receiver operate at a specific control point. The control point represents a combination of voltage and current provided at an output of the power receiver when the power transfer is performed.

In more detail, the power receiver selects a desired control point—desired output current/voltage, a temperature of a specific location of the mobile device, etc., and determines an actual control point which currently operates at present. The power receiver may calculate a control error value by using the desired control point and the actual control point and transmit the control error value as a control error packet to the power transmitter.

In addition, the power transmitter sets/controls a new operating point—the amplitude, the frequency, and the duty cycle—by using the received control error packet to control the power transfer. Accordingly, the control error packet is transmitted/received at a pre-configured time interval in the power transfer phase and as the embodiment, the power receiver may set and transmit a control error value as a negative value in the case of intending to decrease the current of the power transmitter and set and transmit the control error value as a positive value in the case of intending to increase the current. As described above, in the inductive mode, the power receiver transmits the control error packet to the power transmitter to control the power transfer.

The resonance mode to be described below may operate in a different manner from that in the inductive mode. In the resonant mode, one power transmitter needs to be able to charge a plurality of power receivers simultaneously. However, in the case of controlling the power transfer as in the inductive mode described above, the power to be transferred is controlled by communication with one power receiver, and as a result, it may be difficult to control the power transfer for additional power receivers. Therefore, in the resonant mode of the present invention, a method is to be used, in which the power transmitter commonly transfers basic power and the power receiver controls a resonant frequency thereof to control the amount of received power. However, the method described in FIG. 4 is not completely excluded in the operation of the resonant mode and additional transmission power may be controlled by the method of FIG. 4.

Shared Mode (Resonant Mode)

FIG. 5 illustrates a power transmission device according to an embodiment of the present invention.

In FIG. 5, the power transmission device may include at least one of a cover 3031 covering a coil assembly 3020, a power adapter 3070 supplying power to the power transmitter, a power transmitter PTx transmitting wireless power, or a user interface 3068 providing power transfer progress and other pertinent information. In particular, the user interface 3068 may be optionally included or may be included as another user interface of the power transmission device.

The power transmitter PTx may include at least one of the coil assembly 3020, a tank circuit (or impedance matching circuit) 3040, an inverter 3080, a communication unit 3030 or a control unit 3050.

The coil assembly 3020 includes at least one primary coil that generates the magnetic field and may be referred to as a coil cell.

The impedance matching circuit 3040 may provide impedance matching between the inverter and the primary coil(s). The impedance matching circuit 3040 may cause resonance at a suitable frequency to boost primary coil current. The impedance matching circuit 3040 in a multi-coil power transmitter may further include a multiplexer that routes a signal from the inverter 3080 to a subset of the primary coils. The impedance matching circuit 3040 may be referred to as a tank circuit.

The inverter 3080 may convert a DC input signal into an AC signal. The inverter 3080 may be driven as a half-bridge or full-bridge to produce a pulse wave and the duty cycle of an adjustable frequency. Further, the inverter 3080 may include a plurality of stages so as to adjust an input voltage level.

The communication unit 3030 may perform communication with the power receiver. The power receiver performs load modulation to communicate a request and information for the power transmitter PTx. Thus, the power transmitter PTx may monitor an amplitude and/or a phase of current and/or voltage of the primary coil in order to demodulate data transmitted by the power receiver by using the communication unit 3030. Further, the power transmitter PTx may control output power to transmit data using a frequency shift keying (FSK) method or the like through the communication unit 3030. To this end, a wireless charger may additionally include a current sensor to detect the receiver by detecting a current change of the primary coil, and to detect the transmitted data of the detected receiver.

The control unit 3050 may control communication and power transfer of the power transmitter. The control unit 3050 may control power transmission by adjusting the operating point. The operating point may be determined, for example, by at least one of an operating frequency, the duty cycle, and an input voltage.

The communication unit 3030 and the control unit 3050 may be provided as a separate unit/element/chipset or may be provided as one unit/element/chipset as illustrated in FIG. 1.

Although not shown in the figure, a Radio Frequency Identification (RFID)/Near Field Communication (NFC) reader unit (or an NFC function unit) for detecting the RFID/NFC cards may be further mounted on a power transmitter.

FIG. 6 illustrates a power reception product or device PRP according to an embodiment of the present invention.

In FIG. 6, the power reception product or device PRP may include at least one of a user interface 4020 that provides power transfer progress and other pertinent information, a power receiver PRx that receives wireless power, a load circuit 4080, or a base 4010 that supports and covers a coil assembly 4070. In particular, the user interface 4020 may be optionally included or may be included as another user interface of the power reception device PRP.

The power receiver PRx may include at least one of the power converter 4050, the tank circuit (or impedance matching circuit) 4060, the coil assembly 4070, the communication unit 4040, and the control unit 4030.

The power converter 4050 may convert AC power received from the secondary coil to voltage and current suitable for the load circuit 4080. As the embodiment, the power converter 4050 may include a rectifier. Additionally, the power converter 4050 may adapt reflected impedance of the power receiver PRx.

The impedance matching (tank) circuit 4060 may provide impedance matching between a combination of the power converter 4050 and the load circuit 4080 and the secondary coil. As the embodiment, the impedance matching circuit 4060 may cause resonance in the vicinity of 100 kHz which may enhance the power transfer.

The coil assembly 4070 may include at least one secondary coil and optically further include an element that shields a metal portion of the receiver from the magnetic field.

The communication unit 4040 may perform load modulation for communication of the request and other information to the power transmitter PTx. To this end, the power receiver PRx may switch a resistor and a capacitor so as to change reflection impedance.

The control unit 4030 may control reception power. To this end, the control unit 4030 may determine/calculate a difference between an actual operating point of the power receiver PRx and a desired operating point. In addition, the control unit 4030 may adjust/reduce the difference between the actual operating point and the desired operating point by requesting adjustment of the reflection impedance of the power transmitter PTx and/or adjustment of the operating point of the power transmitter PTx. When the difference is minimized, optimal power reception may be performed.

The communication unit 4040 and the control unit 4030 may be provided as a separate element/chipset or may be provided as one element/chipset as illustrated in FIG. 1.

Meanwhile, although not shown in the figure, a Radio Frequency Identification (RFID)/Near Field Communication (NFC) reader unit (or an NFC function unit) for detecting the RFID/NFC cards may be further mounted on a power transmitter.

In the shared mode, the power transmitter needs to manage an exchange of information with one or more power receivers. To this end, the power transmitter provides a structure for communication with the power receiver and such a structure is the same as a communication frame described below.

In FIG. 7, the power transmitter provides a structure that provides a sequence of time slots in which each power receiver may transmit data packets. A sync pattern illustrated in FIG. 7 is provided between the respective slots. The sync pattern serves not only to separate the slots, but also to optimize the communication of the power receiver. In particular, the sync pattern may provide the receiver with information for collision resolution and guaranteed latency.

FIG. 7 illustrates a frame structure for data communication during power transfer. A shard mode protocol may use two types of frames, i.e., a slotted frame and a free-format frame. The slotted frame may be used for the power receiver to transmit short data packets to the power transmitter and the free-format frame may be used for other purposes such as bi-directional larger data packet transmission and coil selection in the multi-coil transmitter.

All frames start with the sync pattern and a measurement slot and the measurement slot may be used to measure the transmission power and the reception power. As the embodiment, 9 slots may be included in one slotted frame. For the free-format frame, there are no specific format restriction beyond the sync pattern and the measurement frame. A start bit (information) of a sync packet may indicate the start of the frame.

FIG. 8 is a diagram illustrating a sync packet according to an embodiment of the present invention.

As illustrated in FIG. 8, the sync packet may include at least one of a preamble, a start bit, a response field, a type field, an Info field, and a parity bit.

The preamble includes a sequence of bits set to one. The number of bits involved may vary depending on the operating frequency. The start bit may be set to zero. The parity bit is a last bit of the sync pattern, and may be set to 1 when the bits set to 1 included in the data fields included in the sync pattern are even and to 0 otherwise.

The response field may include a response of the transmitter to communication from the receiver in a preceding slot. 00 may indicate non-acknowledge regarding that the communication may not be detected, 01 may indicate not-acknowledge regarding that a communication error is detected, and 10 may indicate not-acknowledge regarding that the communication is correctly received, and 11 may indicate acknowledge regarding that the communication is correctly received.

The type field may be set to 1 for a first sync pattern included in the frame and may be set to 0 for other sync patterns.

The Info field has a different value and meaning according to the sync pattern indicated in the sync field. First, when the type field is 1, the info field may indicate whether the frame is the slotted frame or the free-format frame. In addition, when the type field is 0, the Info field may indicate whether a next slot is a slot allocated to a specific receiver, a slot temporarily provided to a specific receiver, or a free slot which may be used by any receiver.

FIG. 9 is a diagram illustrating a power transmission method in a shared mode.

In the shared mode, the power transfer method may include a selection phase, an introduction phase, a configuration phase, a negotiation phase, and a power transfer phase.

The selection phase may represent a selection phase in the inductive mode illustrated in FIG. 3 and in the shared mode, the selection phase may be omitted and the remaining four phases may be described. In the shared mode, if the presence of frequency shift keying (FSK) in the electric power signal is detected before the wake-up timeout, the process may proceed directly to the introduction phase.

In the introduction phase, the power receiver may request a free slot to transmit control information (CI) packets to use in the next phases. To this end, the receiver transmits an initial CI packet. When the power transmitter responds with the ACK, the power receiver may proceed to the configuration phase. When the power transmitter responds with the NAK, another receiver may perform the configuration phase or the negotiation phase. Therefore, the receiver may request the free slot again. When the receiver receives the ACK, the receiver may determine a private slot thereof in the frame and thereafter, transmit the CI packet b using the slot at the corresponding location.

In the configuration phase, the power transmitter may provide a series of locked slots for exclusive use of the power receiver. This is for the receiver to perform the configuration phase without a collision. The receiver may transmit two identification data packets (IDHI and IDLO), and optionally at least one proprietary data packets, and a configuration packet (CFG) using the locked slots. Upon completing such a phase, the receiver may proceed to the negotiation phase.

In the negotiation phase, the transmitter may also continuously provide the locked slots for exclusive use of the receiver. This is also for the receiver to perform the negotiation phase without the collision. The receiver uses the locked slots to transmit negotiation data packets (including a specific request (SRQ) and a general request (GRQ)) and at least one optional proprietary data packet. Then, the receiver may terminate the negotiation phase by transmitting an SRQ/en (SRQ/end-negotiation) packet. When such a phase is terminated, the transmitter proceeds to the power transfer phase and the transmitter stops providing the locked slots.

In the power transfer phase, the receiver transmits the CI packet using the allocated slot. The, the receiver receives the power. The power receiver may include a regulator circuit. The regulator circuit may be included in the communications and control unit. The receiver may self-regulate the reflection impedance of the receiver through the regulator circuit. That is, the receiver may adjust the reflection impedance so as to transfer the amount of power required for an external load and prevent reception of excessive power or overheat. In the shared mode, the transmitter may not adjust the power corresponding to the received CI packet according to the operation mode, so that it is possible to control preventing an over-voltage situation in this case.

Foreign Object Detection (FOD) Extensions

Hereinafter, FOD extension for detecting a foreign object that is not a wireless charging object in performing the power transmission/reception/control method in the inductive mode described above with reference to FIGS. 3 and 4 will be described. This FOD extension may be performed in such a manner that the negotiation phase, a calibration phase, and a renegotiation phase are added to a basic system control method, as illustrated in FIG. 10. The newly added phases may mainly perform a function for detecting the foreign object.

FIG. 10 is a diagram illustrating a method for controlling a wireless power transmission/reception system to which FOD extension is applied according to an embodiment of the present invention. The description of each phase described above with reference to FIGS. 3 and 4 may be applied in the same or similar manner and hereinafter, differences from FIGS. 3 and 4 will be mainly described, and duplicated description will be omitted.

Referring to FIG. 10, in the selection phase, the power transmitter may monitor an interface surface and monitor the placement and removal of objects using small measurement signals. This measurement signal should not wake up the power receiver located on the interface surface. When the power transmitter senses the foreign object on the interface surface, the power transmitter needs to remain in the selection phase and should not provide the electric power signal to prevent overheating of the foreign object.

In the negotiation phase, the power receiver may negotiate with the power transmitter to minutely adjust the power transfer contract. To this end, the power receiver may transmit a negotiation request to the power transmitter which the power transmitter may accept or reject. In addition, to improve a capability of an initial evaluation of the presence of the foreign object, the power transmitter may compare a quality factor reported by the power receiver with a measurement value (or signal) thereof. When the power transmitter detects the foreign object, the process needs to return to the selection phase.

In the calibration phase, the power transmitter may enhance a capability to detect the foreign object during power transmission. In particular, the power transmitter may adjust parameters of a power loss method. Here, the power receiver may provide the reception power thereof under two load conditions.

In the power transfer phase, the power transmitter may continually check whether a new foreign object is placed on the interface surface. To this end, the power transmitter may use an FOD power loss method based on, for example, a calibrated power loss calculation. The power receiver may also check the placement of the new foreign object. When the power transmitter or power receiver detects the foreign object, the power transmitter and/or the power receiver must reduce the electric power signal or remove the electric power signal and return to the selection phase.

In the renegotiation phase, the power transmitter may adjust the power transfer contract when desired. If necessary, the renegotiation phase may be terminated prematurely without changing the power transfer contract.

In the calibration phase, the power transmitter needs to receive from the power receiver information which the power transmitter will use to improve the power loss method for the FOD. In particular, the power transmitter needs to receive received power information from the power receiver and the power receiver at this time transmits the received power information at a light load (disconnected load) and a connected load. If the power transmitter does not receive such received power information, the power transmitter may remove the electric power signal and return to the selection phase. However, the power transmitter may attempt to improve the power loss method by using the received power information only when it is confirmed that there is no foreign object.

The operation of the power transmitter in the calibration phase may be the same as the operation in the power transfer phase, but the following operations may be added.

If the power transmitter receives a 24-bit received power packet with the mode field set to '001' (calibration mode for the light load) and if the received power value is met, the power transmitter may transmit an ACK response. Otherwise, the power transmitter may transmit an NAK response.

If the power transmitter receives a 24-bit received power packet with the mode field set to '010' (calibration mode for the connected load) and if the received power value is met, the power transmitter may transmit the ACK response and continuously perform the power transfer phase. Otherwise, the power transmitter may transmit the NAK response.

Here, the received power packet (RPP) may correspond to a packet transmitted to the power transmitter at least once by the power receiver in the negotiation phase in order to change the format of the received power packet determined in the power transfer contract. When the power transmitter transmits the ACK response to the received power packet, the format of the received power packet in a provisional power transfer contract may be changed based on the received power packet in which the ACK response is transmitted.

Communication Article Selection Method in Wireless Power Transmitter and Power Receiver Using Multi-Communication Rule Hereinafter, a communication rule selection method in a wireless power transmitter and power receiver using a multi-communication rule is described with reference to FIGS. 11 to 13. The following contents relate to a communication rule selection method which enables various applications of wireless power transmission by supporting various communication methods between a power transmitter and a power receiver.

In order for power transmitters and power receivers manufactured by different companies to smoothly perform their roles, a wireless power transmission-related technology is standardized in WPC. In a wireless power transmission method regulated in WPC, only uni-directional communication from a power receiver to a power transmitter is supported for stabilized output control. A major object of the communication is to feed a control error back from the power receiver to the power transmitter. An amplitude modulation method using a change in the magnetic field is used as a modulation method, and the transfer rate is merely several kHz. Accordingly, a communication method regulated so far is vulnerable to an electrical, magnetic disturbance and supports only uni-directional communication, and is impossible for applications, such as the transfer of information from a power transmitter to a power receiver. Furthermore, the current communication method has a limit in the transfer of a large amount of information because the transfer rate is low.

FIGS. 11 and 12 are concept views showing a WPC communication flow.

In the last phase of the communication flowchart of FIG. 11, a phase for determining whether to use a different communication method other than a communication method regulated in WPC may be added as in FIG. 12. Accordingly, the present invention can extend the application range of a power transmitter and power receiver by optionally providing a method of performing communication according to a different communication method in addition to the standards regulated in WPC. A description regarding each phase of FIGS. 10 and 12 is the same as that of FIGS. 3 and 9, and a redundant description is omitted.

FIG. 13 is a communication flowchart according to an embodiment of the present invention.

Referring to FIG. 13, first, a power receiver may transmit, to a power transmitter, communication information indicating whether a first communication method, that is, a communication method according to the WPC standard, and a second communication method, that is, a different communication method, may be used/supported using the communication method according to the WPC standard (S1310).

In this case, to perform communication using the communication method according to the WPC standard may be interpreted as having the same meaning as that in-band (IB) communication is performed. To perform communication using a communication method not complying with the WPC standard may be interpreted as having the same meaning as that out-of-band (OOB) communication is performed. IB communication, as previously defined in the WPC standard, may be performed based on a load modulation method (Rx to Tx) and a frequency shift keying (FSK) method (Tx to Rx).

Next, the power transmitter may determine whether the second communication method may be used using the communication information received from the power receiver (S1320). The second communication method may be various communication methods used for short range communication. For example, the second communication method may be at least one of Bluetooth, radio frequency identification (RFID), infrared data association (IrDA), a ultra wideband (UWB), ZigBee, near field communication (NFC), (wireless-fidelity (Wi-Fi), Wi-Fi Direct or wireless universal serial bus (USB) technology. Specifically, the second communication method may correspond to a Bluetooth communication method commonly used in home appliances.

If the power transmitter and the power receiver can use the second communication method, the power transmitter and the power receiver may be separately equipped with hardware communication modules supporting the second communication method.

Next, if the second communication method may be used (Yes in S1320), the power transmitter may notify the power receiver whether the second communication method may be used as a response to the communication information (S1330). A response phase for the communication information may be selectively performed and may be omitted or substituted with another phase.

Next, the power receiver that has received information indicating that the second communication method may be used may determine whether to use the second communication method (S1360). If it is determined that communication will be performed using the second communication method (Yes in S1360), the power receiver may notify the power transmitter that communication will be performed using the second communication method. That is, the power receiver may notify the power transmitter whether to use the second communication method as a response to the reception of the information indicating that the second communication method may be used.

Thereafter, if it is determined that the use of the second communication method is possible, the power transmitter may initialize a communication state so that communication is performed using the second communication method (S1340). Furthermore, the power receiver may initialize a communication state in order to use any one of the first and the second communication methods (S1370).

More specifically, if the power receiver uses the second communication method, the communication state of the power receiver may be initialized in order to perform communication using the second communication method (S1380). However, if it is determined that communication is not performed using the second communication method (No in S1360), the power receiver may perform communication using the first communication method according to the WPC standard (S1362).

Although the power transmitter has initialized the communication state so that communication is performed using the second communication method, if the power receiver performs communication using the first communication method, the power transmitter may also be controlled to perform communication using the second communication method. More specifically, if the power receiver does not perform communication using the second communication method within a preset time or continues to perform communication using the first communication method, the power transmitter may change a communication method/state to the first communication method.

If, as a result of the determination of the power transmitter, communication using the second communication method cannot be performed (No in S1320), the power transmitter performs communication with the power receiver using the existing first communication method regulated in WPC and may not perform a phase of transmitting information indicating that communication state initialization and communication are possible (S1322).

A communication rule selection method according to the present embodiment has an effect in that the application range of a wireless charging system is widened because a new communication rule can be selected between a power transmitter and a power receiver. Moreover, if a communication rule robust against disturbance is added as a communication rule that may be selected between a power transmitter and a power receiver, wireless charging performance improvement can be expected.

Furthermore, the communication rule selection method according to the present embodiment may be applied all wireless charging systems borrowing an induction method and/or a resonance method and wireless charging systems in which compatibility between an induction method and a resonance method is possible.

Power Class and Profile of Power Transmitter and Power Receiver

Currently, in WPC, a power class (PC) for a power transmitter and a power receiver is classified as follows based on transmitted and received power levels
1. PC 0
   Least guaranteed power is 5 watt (W)
   Potential guaranteed power (i.e., maximum guaranteed power) is possible up to 30 W
   Example of a major application: a smartphone
2. PC 1
   Least guaranteed power is 30 W
   Potential guaranteed power (i.e., maximum guaranteed power) is possible up to 150 W
   Example of a major application: a lap-top, a power tool
3. PC 2
   Least guaranteed power is 200 W
   Potential guaranteed power (i.e., maximum guaranteed power) is possible up to 2 kW
   Example of a major application: Kitchen appliances As described above, the PC may be identified based on a power level, and whether to support compatibility between the same PCs may be optional or essential. In this case, compatibility between the same PCs means that power transmission and reception are possible between the same PCs. For example, if a power transmitter having a PC x can charge a power receiver having the same PC x, it may be considered that compatibility between the same PCs is maintained. Likewise, compatibility between different PCs may also be supported. In this case, compatibility between different PCs means that power transmission and reception are possible between different PCs. For example, if a power transmitter having a PC x can charge a power receiver having a PC y, it may be considered that compatibility between different PCs is maintained.

As described above, the support of compatibility between PCs is a very important issue in the user experience and infra construction aspect. However, the maintenance of compatibility between PCs has the following several problems technically.

In the case of compatibility between the same PCs, for example, a power receiver of a lap-top charging method capable of stable charging only when power is continuously transmitted may have a problem in that it is stably supplied with power from a power transmitter of a power tool method that discontinuously transmits power although the power transmitter is a power transmitter having the same PC. Furthermore, in the case of compatibility between different PCs, for example, if a power transmitter having the least guaranteed power of 200 W transmits power to a power receiver having maximum guaranteed power of 5 W, there is a danger that the power receiver may be damaged due to an overvoltage. As a result, it is difficult to take the PC as an index/criterion that represents/indicates compatibility.

Accordingly, hereinafter, a 'profile' is newly defined as an index/criterion that represents/indicates compatibility. That is, it may be construed that stable power transmission and reception are possible because compatibility is maintained between a power transmitter and power receiver having the same 'profile' and power transmission and reception are impossible between a power transmitter and power receiver having different 'profiles.'

FIG. 14 is a table illustrating profiles newly defined according to an embodiment of the present invention.

Referring to FIG. 14, the profile may be defined depending on whether compatibility is possible and/or an application regardless (or independently of) a power class.

For example, the profile may be basically divided into four types; i) mobile, ii) power tool, iii) kitchen, and iv) wearable.

In the case of the 'mobile' profile, a PC is PC0 and/or PC1, a communication protocol/method is IB and OOB (optional), an operating frequency may be defined as 87~205 kHz, and examples of an application may include a smartphone and a lap-top.

In the case of the 'power tool' profile, a PC is PC1, a communication protocol/method is IB, an operating frequency may be defined as 87~145 kHz, and examples of an application may include a power tool.

In the case of the 'kitchen' profile, a PC is PC2, a communication protocol/method is NFC-based, an operating frequency may be defined as being less than 100 kHz, and examples of an application may include kitchen/home appliances.

In the case of the 'wearable' profile, a PC is PC-1, a communication protocol/method is IB, an operating frequency may be defined as 87~205 kHz, and examples of an application may include a wearable device worn on a user body.

The maintenance of compatibility between the same profiles may be essential, and the maintenance of compatibility between different profiles may be optional.

The above-described profiles (mobile profile, power tool profile, kitchen profile and wearable profile) may be generalized and represented as first to n-th profiles. A new profile may be added/substituted according to the WPC standard and embodiments.

If the profiles are defined as described above, more stable power transmission is possible and a burden of a power transmitter is reduced because the power transmitter selectively performs power transmission on only a power receiver having the same profile as the power transmitter. There is an effect in that a danger of damage to a power receiver is reduced because a power transmitter does not attempt power transmission to a power receiver incapable of compatibility.

PC1 within the 'mobile' profile may be defined by borrowing an optional extension, such as OOB based on PC0. In the case of the 'power tool' profile, a PC1 'mobile' profile may be defined a simply changed version. Furthermore, PC1 has been defined to maintain compatibility between the same profiles so far, but a corresponding technology may be subsequently developed to maintain compatibility between different profiles.

A power transmitter or receiver may notify a counterpart power receiver or transmitter of its profile through various methods. This specification proposes a method for a power transmitter and power receiver to indicate its own profile through a specific field within a specific packet. Embodiments of a packet defined/configured to indicate a profile are proposed hereinafter. Specifically, there are hereinafter proposed embodiments in which reserved bits within packets defined in the existing WPC standard are used as a Profile bit/field indicative of a profile.

FIG. 15 is a diagram illustrating a configuration packet (0x51) of a power receiver according to a first embodiment of the present invention.

Referring to FIG. 15, the configuration packet used by a power receiver in order to notify a power transmitter of its own power reception characteristic/ability may include a Power Class bit/field (2 bits), a Profile bit/field (2 bits), a Maximum Power Value bit/field (6 bits), a Prop bit/field (1 bit), a Count bit/field (3 bits), a Window Size bit/field (5 bits), a Window Offset bit/field (3 bits), a Neg bit/field (1 bit), a Polarity bit/field (1 bit) and/or a Depth bit/field (2 bits). The configuration packet may be transmitted and received in the identification/configuration (or construction) phase.

The Power Class bit/field indicates a PC of a power receiver.

The Maximum Power Value bit/field may indicate different information depending on whether a power receiver supports a foreign object detection (FOD) (extension) function. If the power receiver does not support the FOD extension function, this bit/field may indicate maximum amount of power (Watt) that the power receiver expects to be received from the output of a power transmitter/rectifier. If the power receiver supports the FOD extension function, this bit/field may indicate the scaling coefficient of a received power value reported by the power receiver through a received power packet. In this case, this bit/field may be configured as a value twice the maximum amount of power (Watt) that the power receiver expects to be provided.

The Prop bit/field may indicate a power transmission control method of a power transmitter, which is desired by a power receiver.

When the Neg bit/field is set to '0', this may indicate that a power transmitter should not transmit any response. When this bit/field is set to '1', a power transmitter may indicate that a power receiver should transmit an acknowledge (ACK) response after a configuration packet indicating that the power receiver enters the negotiation phase.

When the Polarity bit/field is set to '0', this may indicate that a power transmitter should use a default FSK polarity. When this bit/field is set to '1', this may indicate that a power transmitter should use a reversed FSK polarity.

The Depth bit/field may indicate an FSK modulation depth.

The Count bit/field may indicate the number of optional configuration packets transmitted by a power receiver in the identification/configuration phase.

The Window Size bit/field may indicate an averaged window size of received power in a 4 ms unit.

The Window offset bit/field may indicate a time interval between a window for averaging received power and received power packet transmission in a 4 ms unit.

The Profile bit/field may indicate profiles (e.g., the above-described four different profiles) of a power receiver. For example, the Profile bit/field:

may indicate the mobile profile when it is set as '00b',
may indicate the power tool profile when it is set as '01b'
may indicate the kitchen profile when it is set as '10b'
may indicate the wearable profile when it is set as '11b'

However, the Profile bit/field is not limited thereto, and a bit/field value indicative of a specific profile may be set as a different value.

FIG. 16 is a diagram illustrating a capability packet (header: 0x31) of a power transmitter according to a first embodiment of the present invention.

Referring to FIG. 16, the capability packet (0x31) used by a power transmitter to notify a power receiver of its own power transmission characteristic/capability may include a Power Class bit/field (2 bits), a Guaranteed Power Value bit/field (6 bits), a Profile bit/field, a Potential Power Value bit/field (6 bits), a wireless power identifier (WPID) bit/field (1 bit) and/or a Not Res Sens. bit/field (1 bit).

The capability packet may be transmitted and received in the negotiation phase (or re-negotiation phase).

The Power Class bit/field indicates a PC of a power transmitter.

The Guaranteed Power Value bit/field indicates a maximum guaranteed power value included in a power transfer contract (PTC-GP) that may be negotiated by a power transmitter in a current surrounding condition. In this case, the surrounding condition may correspond to a temperature of the power transmitter, the amount of power that may be drained by the power transmitter from a power source shared with other power transmitters and/or the presence or absence of a foreign object or friendly metal, for example. The Guaranteed Power Value bit/field indicates a power value in a 0.5 W unit.

The Potential Power Value bit/field indicates a maximum guaranteed power value included in a power transfer contract (PTC-GP) that may be negotiated by a power transmitter in an ideal surrounding condition. This field also indicates a power value in a 0.5 W unit.

The WPID bit/field indicates that a power transmitter has no ability to receive a WPID packet.

The Not Res Sens. bit/field may be set as a different value for each design of each power transmitter. In general, this bit/field may be set to a value '0' in order to indicate a power transmitter design capable of frequency control of less than 150 kHz as a power transfer contract including a maximum power value greater than 5 W.

The Profile bit/field may indicate profiles (e.g., the above-described four different profiles) of a power transmitter. For example, the Profile bit/field:
may indicate the mobile profile when it is set as '00b',
may indicate the power tool profile when it is set as '01b',
may indicate the kitchen profile when it is set as '10b',
may indicate the wearable profile when it is set as '11b'.

However, the Profile bit/field is not limited thereto, and a bit/field value indicative of a specific profile may be set as a different value.

FIG. 17 is a diagram illustrating a configuration packet (0x51) of a power receiver according to a second embodiment of the present invention.

The configuration packet according to the second embodiment is the same as the configuration packet according to the first embodiment except that the size of the Profile bit/field is 3 bits. Accordingly, the description of FIG. 15 may be identically applied to this drawing, and a redundant description thereof is omitted.

The Profile bit/field according to the second embodiment may indicate the mobile profile when it is set as '000b',
may indicate the power tool profile when it is set as '001b',
may indicate the kitchen profile when it is set as '010b',
may indicate the wearable profile when it is set as '011b', for example, and '100b~111b' may be set as reserved bits.

However, the Profile bit/field is not limited thereto, and a bit/field value indicative of a specific profile may be set as a different value.

FIG. 18 is a diagram illustrating a capability packet (header: 0x31) of a power transmitter according to a second embodiment of the present invention.

The capability packet according to the second embodiment is the same as the capability packet according to the first embodiment except that the size of the Profile bit/field is 3 bits. Accordingly, the description of FIG. 16 may be identically applied to this drawing, and a redundant description is omitted.

The Profile bit/field according to the second embodiment:
may indicate the mobile profile when it is set as '000b',
may indicate the power tool profile when it is set as '001b',
may indicate the kitchen profile when it is set as '010b',
may indicate the wearable profile when it is set as '011b',
and '100b~111b' may be set as reserved bits.

However, the Profile bit/field is not limited thereto, and a bit/field value indicative of a specific profile may be set as a different value.

FIG. 19 is a diagram illustrating a configuration packet (0x51) of a power receiver according to a third embodiment of the present invention.

The configuration packet according to the third embodiment is the same as the configuration packet according to the first embodiment except that the size of the Profile bit/field is 4 bits and a profile indication method is different. Accordingly, the description of FIG. 15 may be identically applied to this drawing, and a redundant description is omitted.

The Profile bit/field according to the third embodiment may be configured with 4 bits, and may indicate a specific profile based on the location of a bit value '0' or '1' within the Profile bit/field. For example, a specific profile may be indicated based on the location of a '0' value (or '1' value) within the Profile bit/field. As a result, unlike in the first and the second embodiments, a plurality of profiles may be indicated at the same time.

For example, when the '0' value:
is located in the first least significant bit (LSB) (e.g., '0000b') within the Profile bit/field, the Profile bit/field may indicate the mobile profile,
is located in the second LSB (e.g., '1101b') within the Profile bit/field, the Profile bit/field may indicate the power tool profile,
is located in the third LSB (e.g., '1011b') within the Profile bit/field, the Profile bit/field may indicate the kitchen profile,
is located in the most significant bit (MSB) (e.g., '0111b') within the Profile bit/field, the Profile bit/field may indicate the wearable profile.

If this is generalized, the location of the '0' value (or '1' value) in the Profile bit/field may be interpreted as indicating a specific profile. Accordingly, if a plurality of '0' values is present within the Profile bit/field, the positions of the '0' values and a plurality of corresponding profiles may be indicated. For example, a Profile bit/field in which '0110b' has been set may indicate the wearable profile and the mobile profile. A Profile bit/field in which 1100b' is set may indicate the mobile profile and the power tool profile.

However, the Profile bit/field is not limited thereto, and the location of a bit/field value indicative of a specific profile may be set differently from that of the embodiment if bit/field values can be distinguished.

FIG. 20 is a diagram illustrating a capability packet (header: 0x31) of a power transmitter according to a third embodiment of the present invention.

The configuration packet according to the third embodiment is the same as the configuration packet according to the first embodiment except that the size of the Profile bit/field is 4 bits and a profile indication method is different. Accordingly, the description of FIG. 15 may be identically applied to this drawing, and a redundant description is omitted.

The Profile bit/field according to the third embodiment is configured with 4 bits. A specific profile may be indicated based on the location of a bit value '0' or '1' within the Profile bit/field. As a result, unlike in the first and the second embodiment, a plurality of profiles may be indicated at the same time.

For example, when the '0' value:
- is located in the first least significant bit (LSB) (e.g., '0000b'), the Profile bit/field may indicate the mobile profile,
- is located in the second LSB (e.g., '1101b') within the Profile bit/field, the Profile bit/field may indicate the power tool profile,
- is located in the third LSB (e.g., '1011b') within the Profile bit/field, the Profile bit/field may indicate the kitchen profile,
- is located in the most significant bit (MSB) (e.g., '0111b') within the Profile bit/field, the Profile bit/field may indicate the wearable profile.

If this is generalized, the location of the '0' value in the Profile bit/field may be interpreted as indicating a specific profile. Accordingly, if a plurality of '0' values is present within the Profile bit/field, the positions of the '0' values and a plurality of corresponding profiles may be indicated. For example, a Profile bit/field in which '0110b' has been set may indicate the wearable profile and the mobile profile. A Profile bit/field in which 1100b' is set may indicate the mobile profile and the power tool profile.

However, the Profile bit/field is not limited thereto, and the location of a bit/field value indicative of a specific profile may be set differently from that of the embodiment if bit/field values can be distinguished.

Referring back to FIG. 14, the mobile profile (or the first profile) includes both PC0 and PC1. This means that a mobile profile power receiver of PC 0 is capable of power reception and communication from a mobile profile power transmitter of PC 1 (i.e., maintain compatibility between PC0 and PC1). However, practically, there is a difference between communication protocol/methods that may be supported for each PC. For example, PC 0 may support only IB, and PC1 may support IB and/or OOB. Accordingly, in some cases, communication compatibility between a power transmitter and a power receiver may not be maintained because the power transmitter and the power receiver support different PCs although they have "the same profile (e.g., the first profile/mobile profile)."

However, since compatibility needs to be maintained between a power transmitter and power receiver having the same profile as described above, there is hereinafter proposed a new communication rule selection method for maintaining communication compatibility between a power transmitter and power receiver having the same mobile profile regardless of a supported PC.

For convenience of description, a power transmitter and power receiver supporting PC0 and/or PC1 may be interpreted as meaning a PC0 and/or PC1 support power transmitter and power receiver having the same profile (e.g., mobile profile/first profile), although separately mentioned hereinafter.

Communication Protocol/Method Selection Method in Which Profile and/or PC has Been Taken Into Consideration A communication protocol/method basically includes the first communication protocol/method (IB) and the second communication protocol/method (OOB), as described above in relation to FIGS. 11 to 13. Both the first and the second communication protocols/methods are taken into consideration as a communication protocol/method of a power transmitter now supporting PC1. Which one of the two communication protocols/methods is preferred for each essential function (or category) of a power transmitter supporting PC1 is described with reference to FIG. 21.

FIG. 21 is a table illustrating preference for a communication protocol/method for each category according to an embodiment of the present invention.

Referring to FIG. 21, IB (or close-coupled OOB such as NFC) is preferred in the one-to-one relation (safety control) aspect, IB (or close-coupled OOB such as NFC) is preferred in the compatibility aspect with PC0, OOB is preferred in the regulation issue aspect regarding high power modulation, OOB is preferred in the load variation (e.g., a motor-driven device) aspect, and OOB is preferred in the power factor correction (PFC) and isolation aspect with a power supply channel.

That is, since a communication protocol/method preferred for each necessary condition/each category is different as IB or OOB, the two protocols/methods are supported, but it may be most efficient to optionally apply a specific protocol/method based on a surrounding environment, a charging mode, a communication protocol/method supportable by a power receiver and/or a charging object.

Accordingly, this specification proposes a protocol in which a power transmitter supporting PC1 supports both IB and OOB, but optionally performs a specific protocol/method based on a supported communication protocol/method and charging condition of a counterpart power receiver (or power transmitter).

FIG. 22 is a flowchart illustrating a communication protocol/method selection method of a PCI power transmitter according to an embodiment of the present invention. A description regarding the phases (selection phase, ping phase, ID/configuration (ID/CONFIG) phase, negotiation phase, calibration phase, power transfer phase and re-negotiation phase) is the same as that described in relation to FIGS. 3 and 10, and a redundant description is omitted.

Referring to FIG. 22, the communication protocol/method selection method may be basically divided into the state in which a load has not been connected and the state in which a load has been connected. The state in which a load has not been connected is classified as a low energy mode. In the state in which a load has been connected, power is supplied to the load. The low energy mode may correspond to phases from the selection phase to the calibration phase. The state in which power is supplied to a load may correspond to phases from the calibration phase to the re-negotiation phase.

A PCI power transmitter may perform communication using IB in a protocol-initial step (i.e., prior to the power transfer phase). The reason for this is that i) compatibility with a PC0 power receiver supporting only IB is maintained, ii) a one-to-one relation between a power transmitter and a power receiver is guaranteed, iii) electro-magnetic interference (EMI)-related regulations according to high power output are not problematic as in PC0 in the low energy state.

A PCI power transmitter may negotiate with a power receiver about whether to select which communication protocol/method in the negotiation phase. More specifically, in the negotiation phase, the PCI power transmitter may negotiate with the power receiver about a communication protocol/method to be used in the power transfer phase.

To this end, the PCI power transmitter may first identify a power reception characteristic of the power receiver based on a configuration packet received from the power receiver in the configuration phase. The configuration packet may follow the embodiment of FIG. 23.

FIG. 23 illustrates a configuration packet according to an embodiment of the present invention.

In this configuration packet, a description regarding the remaining bit/fields except an OOB bit/field is the same as that described in relation to FIG. 15.

Referring to FIG. 23, the power receiver may transmit, to the PCI power transmitter, a configuration packet including the OOB bit/field including selection/support/indication information of a communication protocol/method in the configuration phase. That is, the configuration packet includes the OOB bit/field indicating that the power receiver may support which communication protocol/method (as a communication protocol/method to be used during the power transfer phase (or load connection)).

For example, the OOB bit/field may be configured with 1 bit.

The OOB bit/field may indicate that a power receiver does not support an OOB communication protocol/method when the OOB bit/field is set as '0'b, and The OOB bit/field may indicate that a power receiver supports an OOB communication protocol/method when the OOB bit/field is set as '1'b.

However, the OOB bit/field is not limited thereto, and the OOB bit/field may be configured with various bit sizes and may indicate that a power receiver may support which one of IB communication and OOB communication.

As described above, the configuration packet including the OOB bit/field may additionally include the Profile bit/field described in FIG. 15, 17 or 19. In the present embodiment, it has been a prerequisite that a power receiver has the same profile as a power transmitter. Accordingly, the Profile bit/field of the configuration packet may be configured to indicate the same profile as that of the power transmitter.

The power transmitter that has received the configuration packet recognizes whether the PC of the power receiver is PC0 or PC1 and that the power receiver supports which communication protocol/method using a power class field.

Referring back to FIG. 22, as in the example of FIG. 23, the PCI power transmitter may negotiate with the power receiver about which communication rule will be selected based on the configuration packet received from the power receiver.

If the PC of the power receiver is PC0, a communication protocol/method may be selected as IB. The reason for this is that the PC0 power receiver can support only IB.

On the contrary, if the PC of the power receiver is PC1, any one communication protocol/method may be selected based on the configuration packet. For example, if the configuration packet of the embodiment of FIG. 23 is received, when the OOB bit/field included in the configuration packet indicates the support of OOB, OOB may be selected. If not, IB may be selected.

As described above, various messages/packets for the negotiation of a communication protocol/method may be transmitted and received between a power transmitter and a power receiver.

What a PCI power receiver can support which communication protocol/method may be previously determined by a manufacturer (based on other restrictions related to a power receiver product characteristic, maximum power of a power receiver, a power level, etc.) in a manufacturing step.

If a PCI power receiver can support both IB and OOB, the PCI power receiver may select a preferred/desired communication protocol/method and indicate selection information with respect to a PCI power transmitter. In this case, the selection information may be indicated through the OOB bit/field of FIG. 23 or may be indicated through packets transmitted and received in the negotiation phase. If the selection information is indicated through the OOB bit/field of FIG. 23, the OOB bit/field may be interpreted as follows based on a bit value.

When the OOB bit/field is set as '0'b, a power receiver does not prefer an OOB communication protocol/method (or prefers an IB communication protocol/method), When the OOB bit/field is set as '1'b, a power receiver prefers an OOB communication protocol/method.

A PCI power receiver may select a preferred/desired proper communication rule by taking into consideration a surrounding environment (e.g., temperature), rules, a power reception characteristic of the power receiver, a power transmission characteristic of a power transmitter, etc., and may indicate the communication rule with respect to a PCI power transmitter using the above-described method.

If IB is selected according to the above-described protocol, IB communication may be performed from the power transfer phase. If OOB is selected, OOB communication may be performed from the calibration phase. Specifically, in the case of OOB, an OOB configuration may be performed at the early stage of the calibration phase, and may be started from the calibration phase regardless of a load connection state.

In the embodiments of FIGS. 22 and 23, IB may be substituted with NFC, and is described later in relation to FIG. 24.

FIG. 24 is a flowchart illustrating a communication protocol/method selection method of a PCI power transmitter according to an embodiment of the present invention.

The embodiment of this drawing is the same as those of FIGS. 22 and 23 except that IB, that is, the first communication method, is substituted with NFC. Accordingly, the description of FIGS. 22 and 23 is identically applied to this drawing, and a redundant description is omitted hereinafter.

Referring to FIG. 24, prior to a power transfer phase (i.e., if a load is not connected), NFC communication may be performed between a power transmitter and a power receiver. More specifically, the NFC reader of a PCI power transmitter may detect the RFID card and tag of a power receiver placed on the PCI power transmitter, and may perform NFC communication with the power receiver. NFC communication has advantages in that i) a one-to-one relation and close-coupled communication between a power transmitter and a power receiver are guaranteed and ii) electro-magnetic interference (EMI)-related regulations according to high power output are not problematic as in PC0 in the low energy state.

Meanwhile, in the case of the present embodiment, as described above, it has been a prerequisite that a power transmitter and a power receiver have the same profile. If a profile is not separately defined or has a different profile, a power receiver may select a communication protocol/method based on its charging method, profile and/or power reception characteristic, and may transmit selection information to a power transmitter. A selection information transmission method is the same as that described above in relation to FIGS. 22 and 23.

For example, if a power receiver corresponds to a power tool charging method in which discontinuous power supply is permitted, the power receiver may select NFC. The reason for this is that power transfer may be temporarily stopped while NFC communication is performed. In contrast, if a power receiver corresponds to a lap-top charging method in which discontinuous power supply is not permitted (i.e., only continuous power supply is permitted), the power receiver may select OOB. The reason for this is that the simultaneous execution of charging and communication is guaranteed if OOB communication is performed.

In the case of the communication protocol/method selection method of FIGS. 11 to 13, the same profile is not a prerequisite, and a power class is also not taken into consideration. If the communication protocol/method selection method of FIGS. 11 to 13 is actually applied, there is a problem in that communication compatibility between a power transmitter and a power receiver is not maintained. In contrast, the communication protocol/method selection method of FIGS. 22 to 24 has effects in that communication compatibility is stably maintained and an efficient communication protocol/method can be selected for each situation because the communication protocol/method is selected by taking into consideration a power class between the same profiles.

A detailed embodiment if a Bluetooth (or Bluetooth low energy (BLE)) is selected/applied as OOB is described below.

In FIGS. 22 to 24, Bluetooth (or BLE) may be used/applied as OOB communication. If Bluetooth (or BLE) is used as OOB communication, a Bluetooth (or BLE) communication technology standardized so far may be applied to Bluetooth. Specifically, the Bluetooth (or BLE) communication technology may be designed/applied i) to maintain compatibility with a PC0 system and ii) to construct ubiquitous wireless charging infrastructure by maintaining the provision of a smooth and intuitive charging environment to mobile products, such as a smartphone, a laptop and a notebook.

FIG. 25 is a diagram illustrating a Bluetooth (or BLE) medium access control (MAC) packet of a power receiver according to an embodiment of the present invention.

In the negotiation phase, a power receiver may transmit its own Bluetooth (or BLE) MAC address (6 bytes) to a power transmitter using IB communication. In this case, the Bluetooth (or BLE) MAC address may be transmitted to the power transmitter through a newly defined packet or the existing packets transmitted and received in the negotiation phase. In this case, the format of the transmitted packet may be the same as that shown in FIG. 25. However, the format is not limited thereto, and a packet may be defined in various formats as long as it indicates the Bluetooth (or BLE) MAC address of a power receiver.

When the power transmitter successfully receives the corresponding packet without an error, it may transmit acknowledgement (ACK) to the power receiver as a response thereto.

FIG. 26 illustrates a Bluetooth (or BLE) handover procedure according to an embodiment of the present invention.

After a negotiation phase using IB communication, a power transmitter PTx may establish a Bluetooth (or BLE) connection using a Bluetooth (or BLE) communication protocol/method and the MAC address of a power receiver PRx in the calibration phase.

1. To this end, the power transmitter may transmit, to the power receiver, a CONNECT_REQ message to request Bluetooth (or BLE) connection establishment with the power receiver. In this case, the transmitted CONNECT_REQ message may have included the MAC address of the power transmitter and all parameters necessary to establish the Bluetooth (or BLE) connection between the power transmitter and the power receiver.
2. If the Bluetooth (or BLE) connection request of the power transmitter is approved, the power receiver may transmit, to the power transmitter, an ACK message as a response to the CONNECT_REQ message. Accordingly, the Bluetooth (or BLE) connection may be established between the power transmitter and the power receiver. In this case, in an established Bluetooth (or BLE) profile, service may be configured as 'WPC_service_UUID.' The power transmitter may be configured and operate as a master (link layer), a central (generic access profile (GAP)) and a client (generic attribute profile (GATT)), and the power receiver may be configured and operate as a slave (link layer), a peripheral (GAP) or a server (GATT).
3. Next, an authentication procedure may be performed between the power transmitter and the power receiver. When the authentication procedure is successfully completed, the power transmitter and the power receiver perform communication using the Bluetooth (or BLE).
4. When the authentication procedure is completed, the power transmitter may transmit, to the power receiver, a 'Read_Received Power' message for requesting received power information of the power receiver.
5. The power receiver may transmit, to the power transmitter, a 'Received Power' message including the received power information as a response to the 'Read_Received Power' message.
6. The power transmitter may transmit a 'Write_Load_ON' message to the power receiver. The 'Write_Load_ON' message is a command for allowing the power receiver to connect to a load and to receive power. In the current WPC standard, the time when a load is connected is determined by a power receiver, but is not limited thereto. As in the A4WP standard, a power transmitter may determine the corresponding time using BLE.
7. The power receiver may transmit, to the power transmitter, a 'Received Power' message including the received power information as a response to the 'Write_Load_ON' message.
8. The power transmitter may transmit, to the power receiver, a 'Read_CE' message for requesting a control error value.
9. The power receiver may transmit, to the power transmitter, a 'CE' message including a control error value as a response to the 'Read_CE' message.
10. The power transmitter may transmit, to the power receiver, a 'Read Received Power' message for requesting the received power information of the power receiver.
11. The power receiver may transmit, to the power transmitter, a 'Received Power' message including the received power information as a response to the 'Read_Received Power' message.

The phases 1 to 7 may be performed in the calibration phase, and the phases 8 to 11 may be performed in the power transfer phase.

FIG. 27 is a flowchart illustrating a wireless power transfer method of a power transmitter according to an embodiment of the present invention. All the above-described embodiments/descriptions may be applied to this flowchart identically, and a redundant description is omitted.

First, the power transmitter may perform a selection phase of monitoring the placement and removal of an object for an interface surface of the power transmitter (S2710). To this end, the power transmitter may use a coil assembly including a primary coil.

Next, the power transmitter may perform digital ping through a first communication protocol by controlling the communication and control unit, and may perform a ping phase of receiving a response from a power receiver (S2720).

Next, the power transmitter may perform an identification/configuration phase of receiving a configuration packet, including configuration information of the power receiver, through the first communication protocol (S2730). The configuration packet includes information on all the power reception characteristics of the power receiver. Specifically, the configuration packet may include power class information of the power receiver and/or communication protocol information of the power receiver. The power class information may indicate a power class classified based on a received power level of the power receiver. The communication protocol information may indicate a communication protocol supported or preferred by the power receiver.

Next, the power transmitter may perform a negotiation phase of selecting any one of the first communication protocol and a second communication protocol different from the first communication protocol based on the power class information and/or the communication protocol information through the first communication protocol by controlling the communication and control unit (S2740). In the negotiation phase, the power transmitter may identify a power class of the power receiver based on the power class information. When the power class of the power receiver is a power class 0 (i.e., PC0), the first communication protocol may be selected. In contrast, when the power class of the power receiver is a power class 1 (i.e., PC1), the power transmitter may select the first or the second communication protocol based on the communication protocol information of the power receiver. More specifically, if the communication protocol information indicates that the power receiver supports or prefers the second communication protocol, the power transmitter may select the second communication protocol. If the communication protocol information indicates that the power receiver does not support or prefer the second communication protocol, the power transmitter may select the first communication protocol.

The power class of the power receiver may be basically divided into a power class 0 and a power class 1. The power class 0 may indicate that received power of the power receiver is within a 5 W to 30 W range. The power class 1 may indicate that received power of the power receiver is within a 30 W to 150 W range. Furthermore, the first communication protocol may correspond to an IB communication protocol defined in a wireless power transmission and reception system. The second communication protocol may correspond to an OOB communication protocol defined in other communication systems other than a wireless power transmission and reception system. For example, the IB communication protocol may correspond to a communication protocol based on the load modulation and FSK method defined in the WPC standard, and the OOB communication protocol may correspond to a short range communication protocol.

Next, the power transmitter may perform a calibration phase of improving the ability to detect an alien substance by controlling a specific parameter (S2750).

Next, the power transmitter may perform communication with the power receiver through the selected communication protocol by controlling the communication and control unit, and may transfer power to the power receiver by controlling the power conversion unit (S2760).

If the second communication protocol is selected in the negotiation phase and the second communication protocol corresponds to Bluetooth, the power transmitter may receive, from the power receiver, the Bluetooth MAC address of the power receiver used for Bluetooth in the negotiation phase. In this case, the power transmitter may transmit, to the power receiver, a connection request message including the Bluetooth MAC address and parameters necessary to establish a Bluetooth connection in the calibration phase.

Meanwhile, the power transmitter and the power receiver may be assumed or pre-required to have the same profile. The compatibility of power transfer and communication is maintained between the power transmitter and the power receiver having the same profile. The profile of the power receiver may be indicated through a configuration packet. The profile of the power transmitter may be indicated through a capability packet including information on a power level transferred by the power transmitter.

The drawings have been separated and described for convenience of description, but the embodiments described with reference to the drawings may be merged and designed to implement a new embodiment. Furthermore, the present invention is not limitedly applied to the configurations and methods of the above-described embodiments, and some of or all the embodiments may be selectively combined so that the embodiments are modified in various ways.

Furthermore, although preferred embodiments have been illustrated and described above, this specification is not limited to the above-described specific embodiments, and a person having ordinary skill in the art to which this specification pertains may modify the disclosure in various ways without departing from the gist of the disclosure in the claims. Such modified embodiments should not be individually understood from the technical spirit or prospect of this specification.

Meanwhile, in this specification, A and/or B may be interpreted as meaning at least one of A and B.

The present invention may be applied various wireless charging technologies.

What is claimed is:

1. A method for transferring, by a wireless power transmitter, wireless power, the method comprising:
   performing digital ping in a ping phase;
   receiving a configuration packet of a wireless power receiver in a configuration phase after the ping phase;
   performing a negotiation of a power transfer contract in a negotiation phase after the configuration phase; and
   transferring the wireless power to the wireless power receiver based on the power transfer contract in a power transfer phase after the negotiation phase,
   wherein the configuration packet includes an out-of-band field,
   wherein the out-of-band field is composed of 1 bit, and
   wherein, based on the out-of-band field having a value of 1, the out-of-band field indicates that the wireless power receiver supports out-of-band communication, and
   based on the out-of-band field having a value of 0, the out-of-band field indicates that the wireless power receiver does not support the out-of-band communication.

2. The method of claim 1, wherein the out-of-band communication is defined in a different communication system other than a transmission and reception system of the wireless power.

3. The method of claim 2, wherein the out-of-band communication corresponds to a short range communication protocol.

4. The method of claim 3, wherein the out-of-band communication is Bluetooth.

5. A wireless power transmitter, comprising:
a converter related to transferring wireless power to a wireless power receiver; and
a communicator/controller related to controlling transfer of the wireless power,
wherein the wireless power transmitter:
performs digital ping in a ping phase;
receives a configuration packet of the wireless power receiver in a configuration phase after the ping phase;
performs a negotiation of a power transfer contract in a negotiation phase after the configuration phase; and
transfers the wireless power to the wireless power receiver based on the power transfer contract in a power transfer phase after the negotiation phase,
wherein the configuration packet includes an out-of-band field,
wherein the out-of-band field is composed of 1 bit, and
wherein, based on the out-of-band field having a value of 1, the out-of-band field indicates that the wireless power receiver supports out-of-band communication, and
based on the out-of-band field having a value of 0, the out-of-band field indicates that the wireless power receiver does not support the out-of-band communication.

6. The wireless power transmitter of claim 5, wherein the out-of-band communication is defined in a different communication system other than a transmission and reception system of the wireless power.

7. The wireless power transmitter of claim 6, wherein the out-of-band communication corresponds to a short range communication protocol.

8. The wireless power transmitter of claim 7, wherein the out-of-band communication is Bluetooth.

* * * * *